US012562834B1

(12) United States Patent
Mohan et al.

(10) Patent No.: US 12,562,834 B1
(45) Date of Patent: Feb. 24, 2026

(54) SYSTEMS AND METHODS FOR PRESENTING SECONDARY CONTENT

(71) Applicant: Amazon Technologies, Inc., Seattle, WA (US)

(72) Inventors: Akshay Mohan, San Jose, CA (US); Eugene Ren, Palo Alto, CA (US); Syed Abdullah Nauroze, Fremont, CA (US); Abhay Abhay, Jaipur (IN); Ganesha Adkasthala Ganapathi Batta, Pleasanton, CA (US); Kari Ellen McMinn, Greenwich, CT (US); Lorin Bird, Mooresville, NC (US); Pradnya Gajanan Chavarkar, Pune (IN); Ioannis Katsavrias, New York, NY (US); Wayne Andrew Purboo, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 34 days.

(21) Appl. No.: 18/524,557

(22) Filed: Nov. 30, 2023

Related U.S. Application Data

(60) Provisional application No. 63/596,492, filed on Nov. 6, 2023.

(51) Int. Cl.
*H04K 1/10* (2006.01)
*G06Q 30/0241* (2023.01)
(Continued)

(52) U.S. Cl.
CPC ........... *H04K 1/10* (2013.01); *G06Q 30/0241* (2013.01); *H04L 65/401* (2022.05); *H04N 19/46* (2014.11)

(58) Field of Classification Search
CPC ...... H04N 19/46; H04K 1/10; G06Q 30/0241; H04L 65/401
See application file for complete search history.

(56) References Cited

U.S. PATENT DOCUMENTS 11,019,300 B1 * 5/2021 Baxendale ....... H04N 21/47815
2014/0189148 A1 * 7/2014 Correa .................... H04L 51/52
709/231

(Continued)

OTHER PUBLICATIONS

Zhang et al. ("Robust audio watermarking based on frequency-domain spread spectrum using CAZAC sequence"—IEEE—Feb. 2014) (Year: 2014).*

*Primary Examiner* — Boris D Grijalva Lobos
(74) *Attorney, Agent, or Firm* — Eversheds Sutherland (US) LLP

(57) ABSTRACT

Systems and methods are provided for presenting secondary content. Particularly, the secondary content may be presented on a first device (such as a smartphone, for example) and may be based on primary content that is being presented to the user via a second device. For example, if a product is shown during a television show being presented to the user via a television, and the user desires to view additional information about the product, the user may interact with a smartphone application. Based on the interaction, the first device may being processing audio produced by the television. Embedded within the primary content may be a number of "tones" that include frequencies that are inaudible to humans. The first device may detect a tone and the tone may be decoded to obtain a timestamp associated with the primary content. This timestamp may then be used to determine which secondary content associated with that timestamp to present to the user on the first device.

13 Claims, 17 Drawing Sheets

200 ⁓

(51) Int. Cl.
    *H04L 65/401*      (2022.01)
    *H04N 19/46*      (2014.01)

(56)            References Cited

U.S. PATENT DOCUMENTS

2014/0245339 A1 *   8/2014   Zhang ................ H04N 21/8358
                                          725/18
2015/0193899 A1 *   7/2015   Oztaskent .............. H04H 60/33
                                     348/E7.001
2024/0305863 A1 *   9/2024   Wilms ............... H04N 21/8173

* cited by examiner

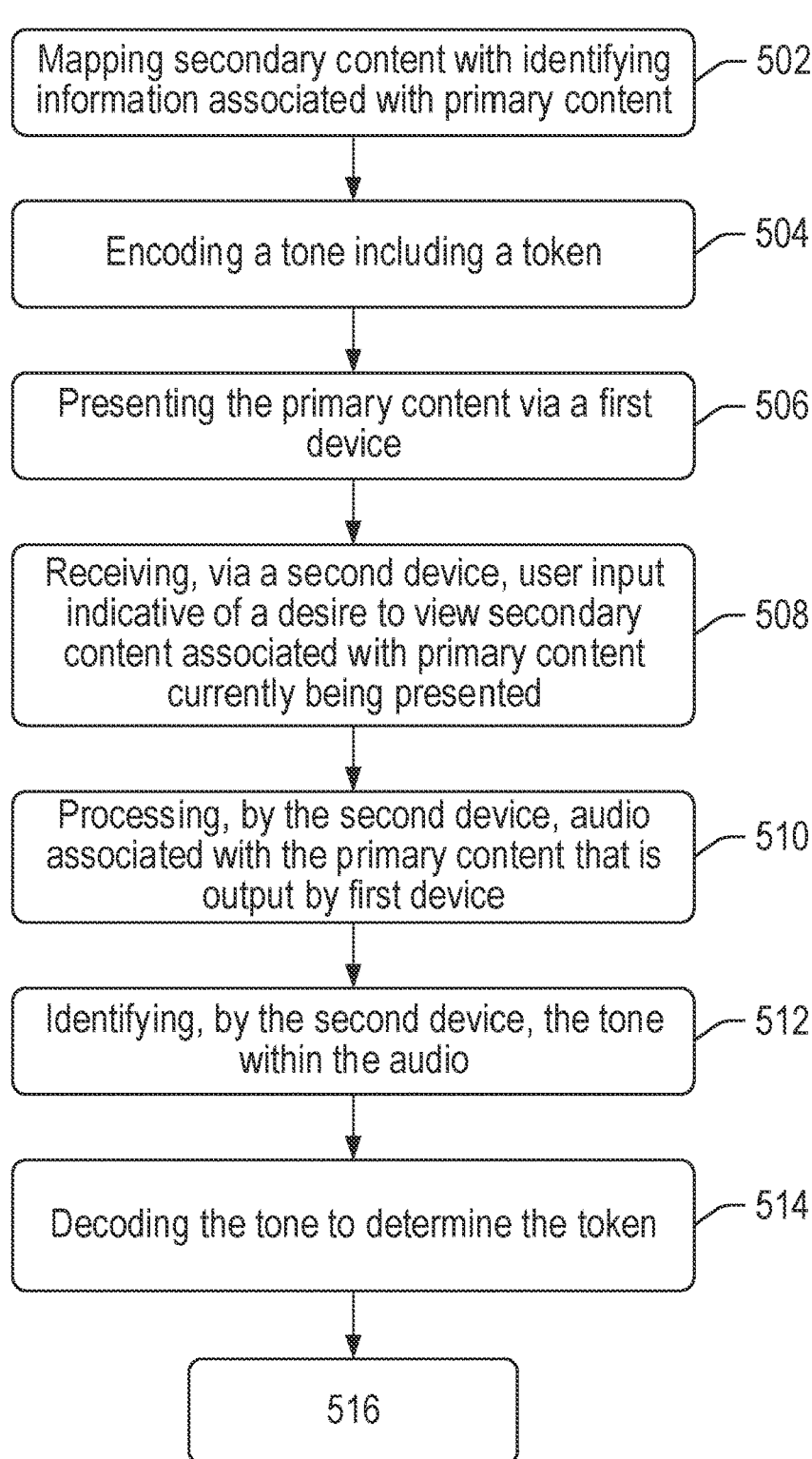

500

Mapping secondary content with identifying information associated with primary content ⟋ 502

Encoding a tone including a token ⟋ 504

Presenting the primary content via a first device ⟋ 506

Receiving, via a second device, user input indicative of a desire to view secondary content associated with primary content currently being presented ⟋ 508

Processing, by the second device, audio associated with the primary content that is output by first device ⟋ 510

Identifying, by the second device, the tone within the audio ⟋ 512

Decoding the tone to determine the token ⟋ 514

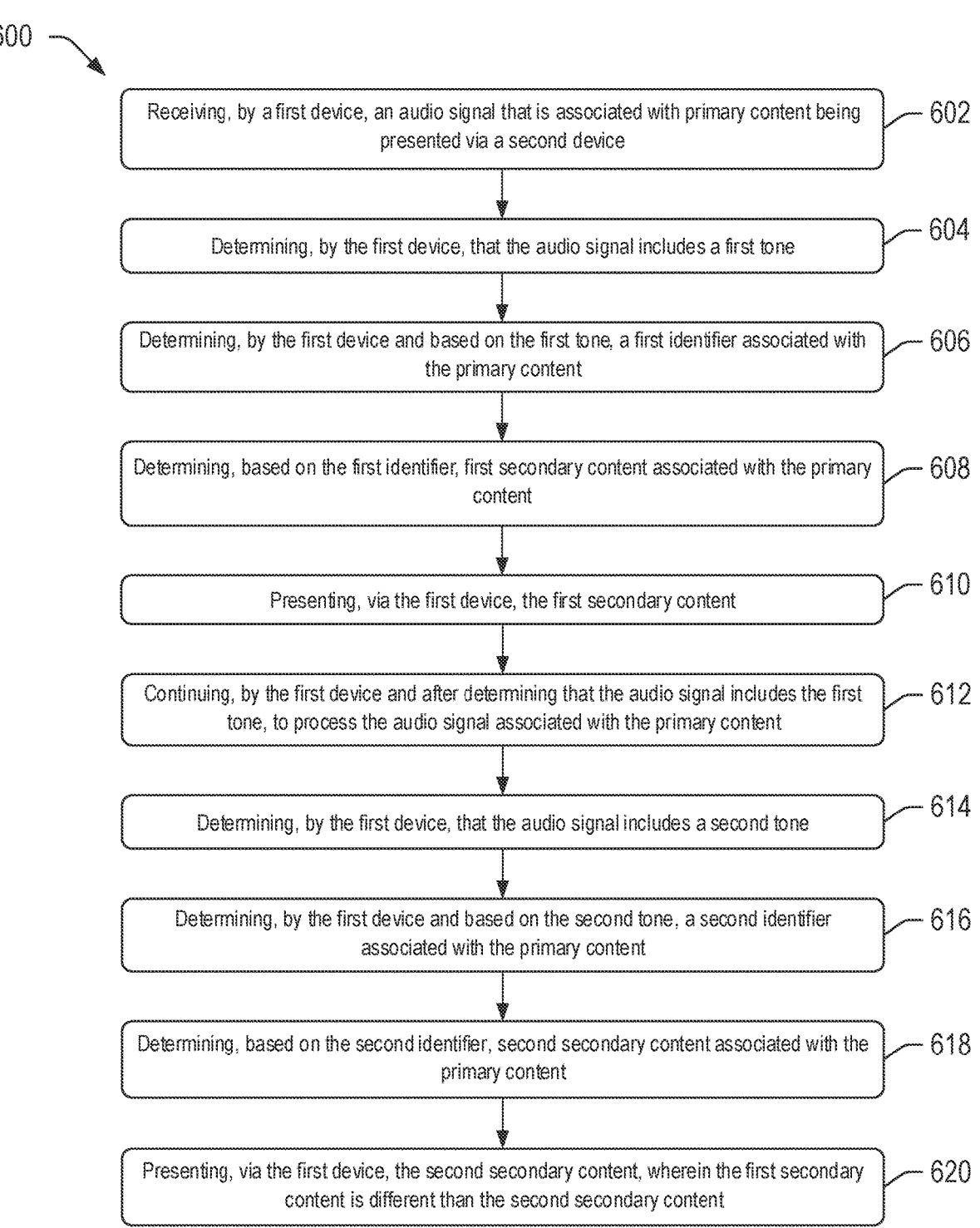

602 — Receiving, by a first device, an audio signal that is associated with primary content being presented via a second device 604 — Determining, by the first device, that the audio signal includes a first tone 606 — Determining, by the first device and based on the first tone, a first identifier associated with the primary content 608 — Determining, based on the first identifier, first secondary content associated with the primary content 610 — Presenting, via the first device, the first secondary content 612 — Continuing, by the first device and after determining that the audio signal includes the first tone, to process the audio signal associated with the primary content 614 — Determining, by the first device, that the audio signal includes a second tone 616 — Determining, by the first device and based on the second tone, a second identifier associated with the primary content 618 — Determining, based on the second identifier, second secondary content associated with the primary content 620 — Presenting, via the first device, the second secondary content, wherein the first secondary content is different than the second secondary content

FIG. 6

SYSTEMS AND METHODS FOR PRESENTING SECONDARY CONTENT

CROSS-REFERENCE TO RELATED APPLICATIONS

This application claims priority to and benefit of U.S. provisional patent application No. 63/596,492 filed Nov. 6, 2023, which is herein incorporated by reference.

BACKGROUND

Conventionally, customers may have a frustrating experience while trying to identify and purchase products they see while viewing content, such as a television show, movie, digital advertisement, etc. Typically, once the customer views the product, they may use a device (such as a smartphone) to attempt to locate the product using a search engine query. However, it may be difficult for the customer to locate the product in this manner. While some television applications may allow customers to purchase products directly through the television, this process may be unintuitive and disruptive to the viewing experience. Customers may be required to use their television remote to navigate through multiple interfaces to access the purchasing capabilities. Many customers may also enjoy watching television with family and friends; however, current television applications may only allow one person to shop while disrupting the viewing experience of the other viewers.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may depending on the context, encompass a plural number of such components or elements and vice versa.

FIGS. 5A-5B depict a flow diagram for presenting secondary content in accordance with one or more example embodiments of the disclosure.

FIG. 6 depicts a method for presenting secondary content in accordance with one or more example embodiments of the disclosure.

DETAILED DESCRIPTION

Figure 1A:
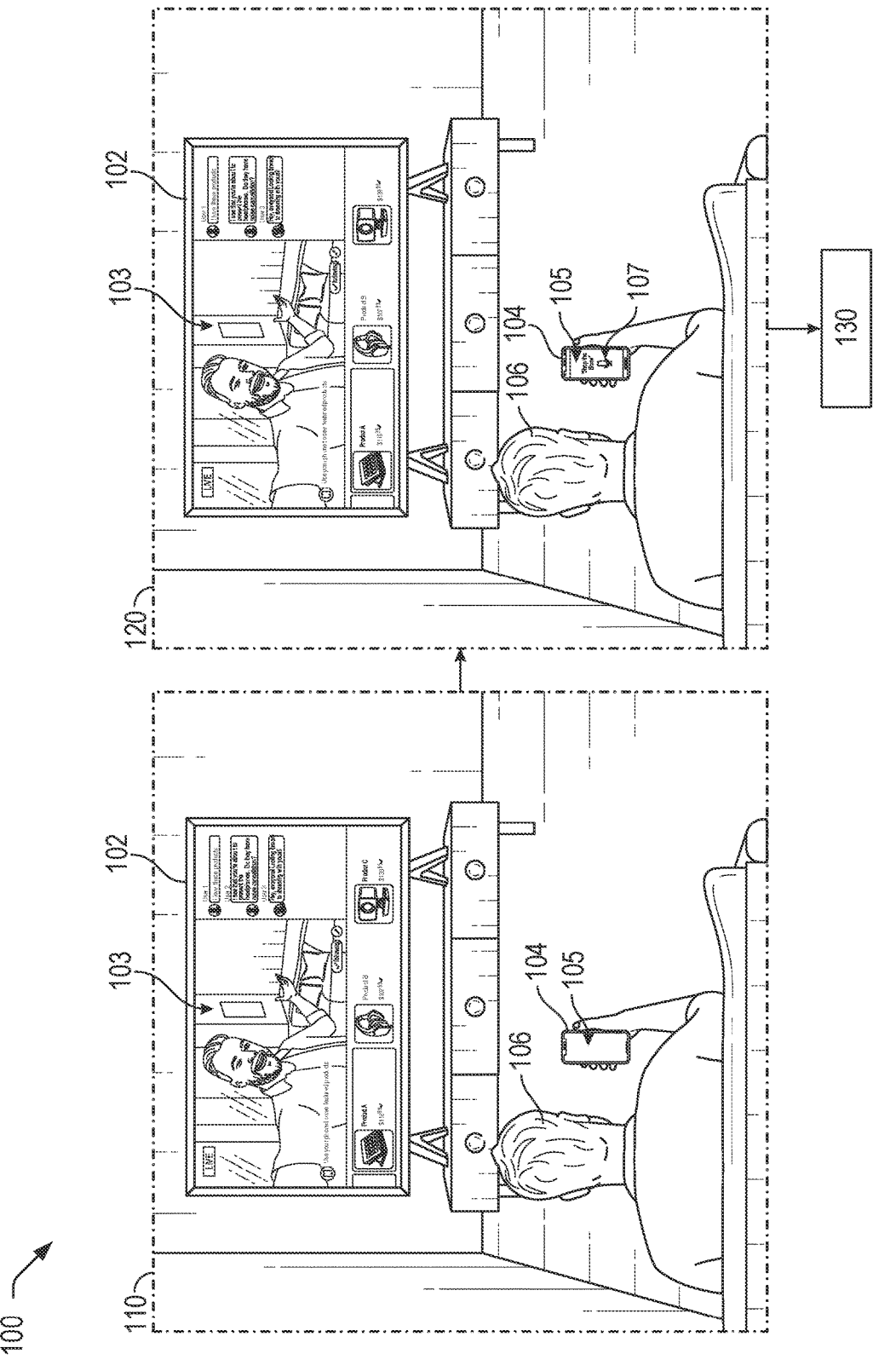
FIGS. 1A-1B depict an example use case for presenting secondary content in accordance with one or more example embodiments of the disclosure.

This disclosure relates to, among other things, systems and methods for presenting secondary content. Particularly, the systems and methods allow users wanting to discover more information about the primary content they are watching on a first device to view secondary content associated with the primary content on a second device. This secondary content may be different than the primary content presented on the first device and may also be displayed on the second device at the same time the primary content is being presented (the term "presented" may not necessarily be limited to video content but may also include audio-only content) by the first device.

To facilitate the presentation of the secondary content on the second device, unique audio tones may be embedded within the primary content at periodical intervals. The second device may be configured to "listen" for these unique audio tones (for example, the second device may receive and process audio associated with the primary content that is output by the first device). When one of the unique tones is detected within the audio by the second device, the tone may be decoded to obtain information that was encoded into the tone. In embodiments, this information may include a token, which may be in the form of a numerical value. The token may then be used to determine identifying information, such as a timestamp of the primary content, a name of the primary content, and/or any other types of identifying information depending on the type of primary content. However, this is not intended to be limiting and the token may be in any other format (such as a string, etc.). This identifying information determined using the token may be used to identify the secondary content associated with that particular time in the primary content to present to the user via the second device.

As an example, 15 minutes into a television show, a character may be shown wearing a particular type of jacket. Secondary content may exist including information about the jacket that the user may view (such as purchasing options for the jacket). A mapping between this secondary content and a timestamp within the television show where the jacket is shown may exist in a database, for example. The audio of the primary content may include an embedded tone at the 15-minute point (or within a given time range from the 15-minute point). When the user sees the jacket while watching the primary content, the user may provide an input to their smartphone indicating that they desire to view additional information about the jacket (or purchase the jacket). Based on the input, the smartphone may begin processing the audio output from the television. During this process, the smartphone may identify a tone within the audio and may decode the tone to obtain a token, which may be in the form of a numerical value (however, any other suitable form is possible). In this particular use case, the numerical value may be used to determine a timestamp within the primary content (in this instance, the 15-minute point). An identifier for the television show may also be determined, such as a name of the television show (or any other type of identifier). This timestamp and identifier may then be used to determine (for example, based on the existing mapping between the timestamp, identifier, and secondary content) that the secondary content associated with the jacket shown at the 15-minute point should be presented to the user via the second device; while the television show continues to be displayed via the first device. While reference is made herein to a timestamp and/or identifier, this is not intended to be limiting, and the token may be used to obtain any other type of identifying information (or combination of identifying information) used to determine the particular secondary content to present to the user.

In embodiments, the tone may include a frequency that is not perceivable by some or all humans. For example, the tone may include a frequency in the range of 18.5-19.5 kHz. The tone may also include multiple frequencies. In this manner, the embedded tones may be detectable by the second device without impacting the viewing experience of the user (the second device may specifically "listen" for tones within this, or any other pre-defined, frequency range). That is, the user may not be able to hear the tone; even though the tone is being emitted as an audio signal by the first device as part of the audio of the primary content. The term "audio signal" when used in reference to the primary content may be used herein to generally describe audio associated with the primary content (for example, the audio associated with a television show). The audio signal may also include any tones or other data that is encoded into the audio associated with the primary content.

The approach described herein provides a number of technical benefits, including overcoming existing device handoff limitations as the user may not be required to sign in to an account to view the secondary content. Additionally, this approach may mitigate or eliminate device requirements, as some devices may not be configured to transmit information to other devices using other protocols, such as Bluetooth low energy (BLE). Thus, the systems and methods described herein may be applicable to a number of different types of devices (including legacy devices); whereas other methods that use different frequency ranges may only be applicable to a more limited range of devices. However, this frequency range of 18.5-19.5 kHz is not intended to be limiting and any other frequency range may also be used.

Additionally, the secondary content may still be presented via the second device even if the first device lacks these technical capabilities. For example, if the first device is a television without smart television capabilities (for example, internet connectivity, the capability to install and use applications, etc.), as long as the television can output audio, the tones may be detected by the second device and the secondary content may still be able to be presented via the second device.

This approach also allows for relevant secondary content to be automatically presented to the user without the user being required to manually use the second device to search for the secondary content. As a non-limiting example, a user may have previously needed to enter a search string into a search engine to view information about a product being presented during a television show, and even through this manual process, the user may not be able to locate the same product shown during the television show.

Additionally, in contrast with existing experiences that may link users to one static secondary content experience for the entirety of the primary content, this approach provides a continuously synchronized experience that presents secondary content relating to the exact segment of the primary content that is being viewed by the user. That is, the approach allows the user to view and interact with real-time secondary content that is relevant to a portion of a live broadcast that is currently being presented to the user, providing a substantial benefit to users viewing live-streamed content. In embodiments, instead of the second device ceasing to process audio after one piece of secondary content is determined and presented via the second device, the continuous synchronization may involve the second device continuing to "listen" for subsequent tones produced by the first device in accordance with the audio of the primary content. In this manner, the second device may provide a continuously synchronized secondary content experience in which different secondary content is presented via the second device depending on the portion of the primary content currently being presented via the first device.

Furthermore, if there are multiple users viewing the content using the same first device, the approach described herein allows the individual users to view secondary content on their own individual devices without interrupting the viewing experience of the primary content on the first device. Individual users may also view different types of secondary content on their devices while the primary content continues to be presented via the first device. For example, if the primary content is a live sports event, a first user may view secondary content on a first smartphone relating to a jersey purchase for a player and a second user may view secondary content on a second smartphone relating to fantasy points produced by a player. Finally, the secondary content may be personalized to specific users such that the secondary content that is presented to a given user may depend on the preferences of that user. The approach described herein may also provide other benefits as well.

The first device may be any type of device configured to present primary content to a user. For example, the first device may be a television, desktop or laptop computer, tablet, smart display, digital billboard, etc. The term "primary content" may simply refer to any type of content that is presented via the first device. The primary content may include any type of content, such as a movie, television show, advertisement, live gaming stream, live sports event, etc. The first device may not necessarily be a device that is configured to present video content. For example, the first device may also be a radio, a speaker, or any other type of device that is only configured to present audio content to a user. That is, the primary content does not necessarily need to include video content. For example, the primary content may also include a podcast, radio broadcast, radio advertisement, etc.

The second device may be any type of device through which the user may view secondary content that is associated with the primary content being presented by the first device. In embodiments, the second device may be a smart-phone including an application through which the user may view the secondary content; however, this is not intended to be limiting, and the second device may also include any other type of device, including devices similar to (or the same as) the first device. For example, the second device may be a desktop or laptop computer, smart display, tablet, etc.

The term "secondary content" may refer to any content that is associated with the primary content and is presented on the second device. As a few non-limiting examples, the secondary content may include product information for a product being presented during a movie or television show, cast and plot information about a movie, player or team statistics associated with a live sports event, a recipe asso-ciated with a meal being made during a cooking show, and/or any other types of content. That is, the secondary content may allow the user to view additional information about the primary content and may also allow the user to interact with the primary content. For example, if a character in a television show is wearing a jacket that the user may desire to purchase, the user may provide an input to the second device to cause information about the jacket to be presented on the second device (or the information may automatically be presented).

Non-limiting examples of these types of devices, as well as primary and secondary content are also provided in the use cases 100-400 of FIGS. 1-4. Additionally, reference to "first device," "second device," etc. is not intended to limit the association of a type of device to the "first device," "second device," etc., but rather provides a manner by which different devices may be distinguished herein. For example, the "first device" may similarly refer to the device that presents secondary content, and the "second device" may refer to the device that presents primary content. Further, any other types of like phrases may be used to distinguish different devices, such as primary and secondary devices, etc.

While reference is made to determining secondary content using embedded tones, the secondary content may still be determined using any other type of suitable mechanism, such as Bluetooth transmissions, account sign-in authoriza-tion, etc.

Turning to the figures, FIGS. 1-4 show various example use cases for presenting secondary content. These use cases merely provide examples of applications of the systems and methods described herein and are not intended to be limit-ing.

Figure 1B:
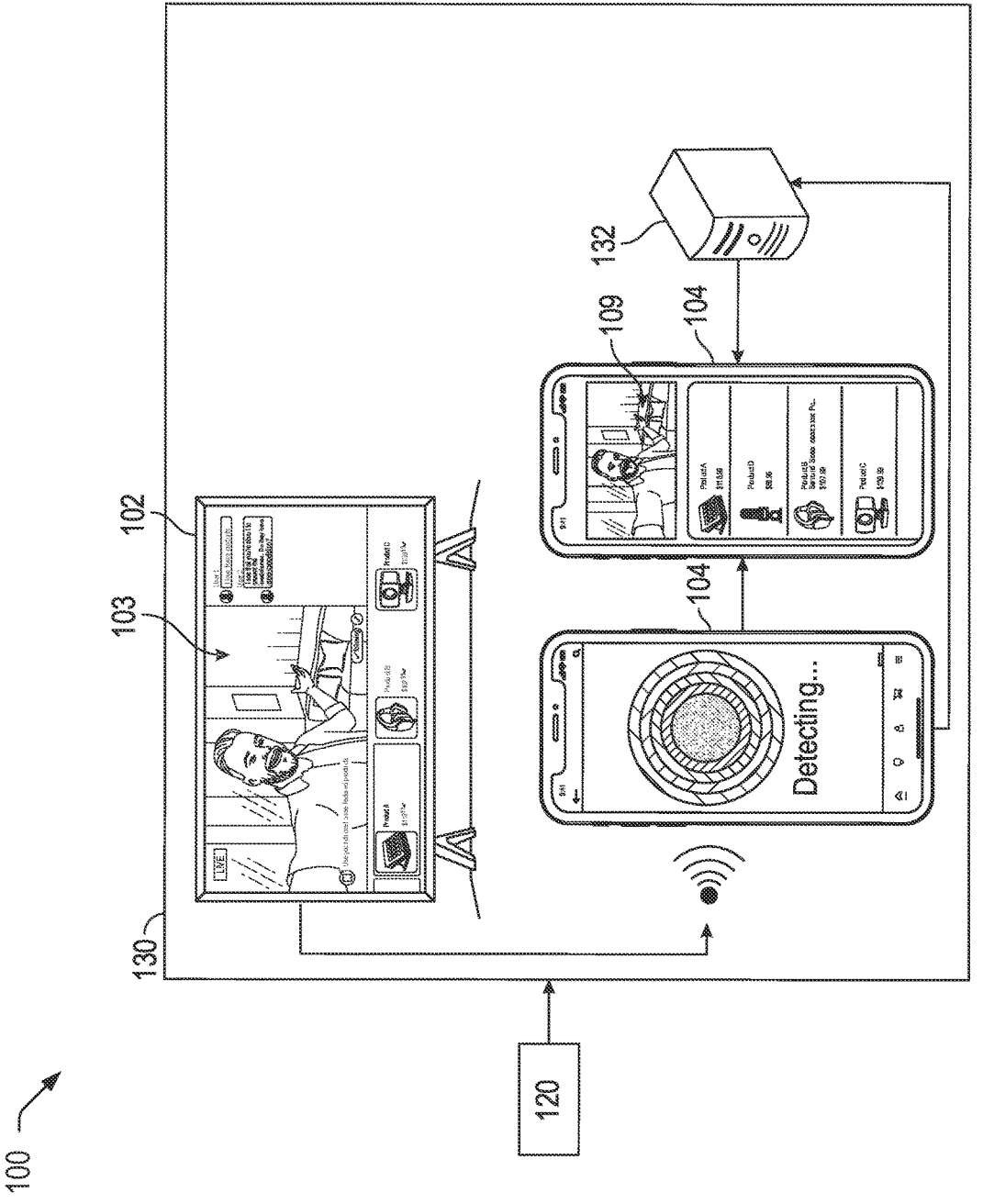

Referring to FIGS. 1A-1B, a first example use case 100 for presenting secondary content is shown. The first use case 100 begins with scene 110, which shows a user 106 lounging within a residential home (for example, in a living room) and viewing primary content 103 using a first device. In this example use case 100, the first device is a television 102 and the primary content 103 is a live stream. The first scene 110 also shows that the user 106 is interacting with a second device, which is shown as being a smartphone 104. Spe-cifically, the user 106 is shown as interacting with an application 105 being presented via the smartphone 104. In this particular use case 100, the application 105 is an online retail shopping application. While reference is made in the use case 100 to a television 102 and a smartphone 104, these types of devices are merely exemplary. The device that is presenting the primary content may also be any other type of device, such as a desktop or laptop computer, tablet, etc. This device may also not necessarily be limited to a device that is configured to display video. For example, the device may be a radio, sound system, etc. Additionally, the device that the user 106 is interacting with may also include any other type of suitable device as well.

Continuing with scene 120, the user 106 is shown as selecting an icon 107 presented on the application 105. The user 106 may select the icon 107 to indicate a desire to view secondary content on the smartphone 104 that relates to the primary content 103 being presented on the television 102. For example, a product may be presented via the primary content and the user 106 may desire to view information about the product and/or potentially purchase the product.

Although the use case 100 shows the user selecting the icon 107 to cause the smartphone 104 to begin processing audio output by the television 102 (for example, the audio associated with the primary content), any other types of input may also be used to trigger such processing by the smartphone 104. For example, the user 106 may provide a voice command to the smartphone 104, such as "show me information about this product." The user 106 may also provide any other type of input to trigger the processing by the smartphone 104.

Further, in some instances, the audio processing by the smartphone 104 may be triggered without requiring the user to provide a manual input intended to trigger the processing. For example, the user 106 may open an online retail shop-ping application but may not explicitly indicate to the smartphone 104 to begin processing audio from the first device 102. However, the action of opening the particular application in itself may trigger the smartphone 104 to begin processing audio from the television 102 to determine if there are any embedded tones providing an indication of secondary content associated with any products that are sold via the online retail shopping application. If such a tone is identified, the smartphone 104 may provide a notification of such and prompt the user 106 to indicate if they desire to view information about the product. The user 106 may then indicate a desire to view the information by interacting with the smartphone 104 and the application may be re-directed to information relating to the product.

Continuing in FIG. 1B with scene 130, when the user selects the icon 107 (or provides any other suitable input), the smartphone 104 may begin processing audio output by the television 102. That is, the smartphone 104 may receive audio associated with the primary content 103 that is emitted by speakers of the television 102. Particularly, the smart-phone 104 may be processing the audio to identify a particular tone or tones that may be embedded within the audio. The tone or tones may be audio signals that are within a frequency range that is not perceivable or not easily perceivable by humans. For example, the tone may include a frequency within the range of 18.5-19.5 kHz; however, any other pre-determined frequency range may also be used.

The tone may be encoded with a token associated with a numerical value (as aforementioned, the token may also be in any form other than a numerical value as well). This token may then be used to determine identifying information, such as a timestamp, an identifier for the primary content, etc. The timestamp may provide an indication of a time within the primary content 103 at which the user 106 requested to view secondary content. For example, if the user selects the icon 107 15 minutes into the primary content 103 when a character is shown wearing a jacket that the user 106 desires to purchase, then the timestamp may be associated with the 15-minute point or a range of time including the 15-minute point. The timestamp may also be associated with a range of times within the primary content as well. For example, the timestamp may be associated with the 13-minute point to the 16-minute point within the primary content. The timestamp may also represent more granular time ranges, such as a second or seconds within the primary content.

Once the timestamp (and/or other identifying information) is obtained, to determine which secondary content 109 to present via the smartphone 104, the timestamp and/or other identifying information may be sent to a system 132. As a non-liming example, the system 132 may be a remote server. Additional identifying information that may be sent along with the timestamp may include, for example, an identifier for the primary content, such as a name of the live stream (or any other form of identifier). Alternatively, the tone may be decoded by the television 102 and/or the smartphone 104, and the timestamp may be sent to the system 132.

Using this information, the system 132 may determine the secondary content 109 to be presented to the user 106 via the smartphone 104. In some instances, the system 132 may perform a lookup within a database to determine that secondary content 109 including information about the product is associated with the timestamp in the database. In such instances, the database may be pre-populated with mappings between secondary content associated with primary content and the identifying information associated with the secondary content. For example, the database may include a mapping between 15 minutes into the primary content and secondary content including information about a first product shown at that time, and the database may also include a mapping between 20 minutes into the primary content and secondary content including information about a second product shown at that time. This secondary content 109 may then be provided by the system 132 to the smartphone 104 for presentation to the user 106. Any of the processing described as being performed on any of the devices or systems may also be performed on any other device or system. For example, the television 102 and/or the smartphone 104 may perform some or all of the actions described as being performed by the system 132. Further, the use of the lookup and the database is merely one example of a mechanism by which the secondary content may be identified based on the timestamp, and the secondary content may also be stored and identified in any other suitable manner.

The secondary content 109 may also include certain social elements. For example, a live chat may be provided through the secondary content 109 that may allow various users who are viewing the primary content to input messages that are viewable by other users through the live chat. The secondary content 109 may also include options to share the secondary content (or elements of the secondary content) via various social media platforms. For example, a user may desire to share an item being presented via the primary content 103 with others via the user's social media accounts. Any other types of social elements may also be provided via the secondary content 109 as well.

Figure 2A:
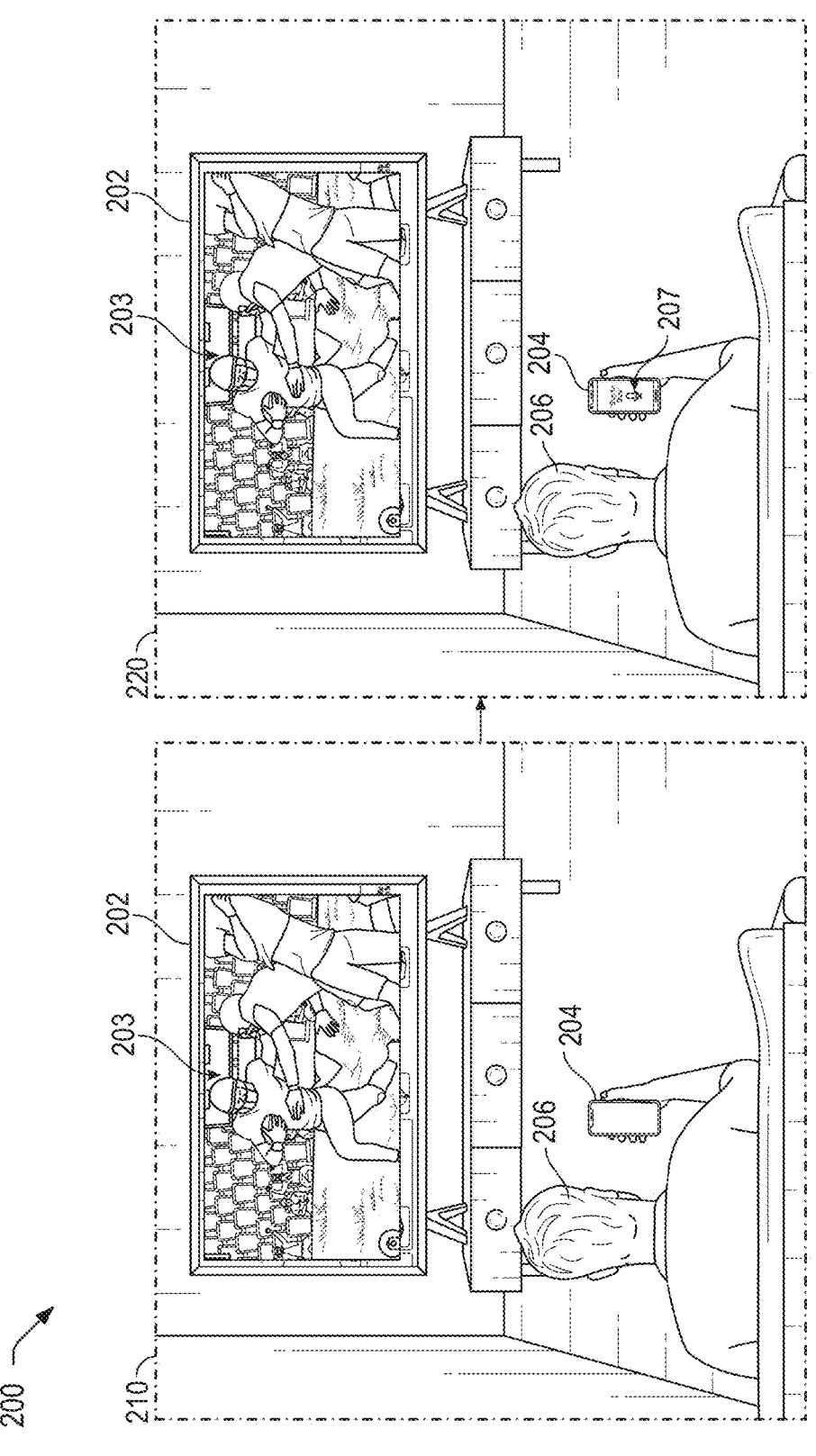
FIGS. 2A-2B depict another example use case for presenting secondary content in accordance with one or more example embodiments of the disclosure.
Figure 2B:
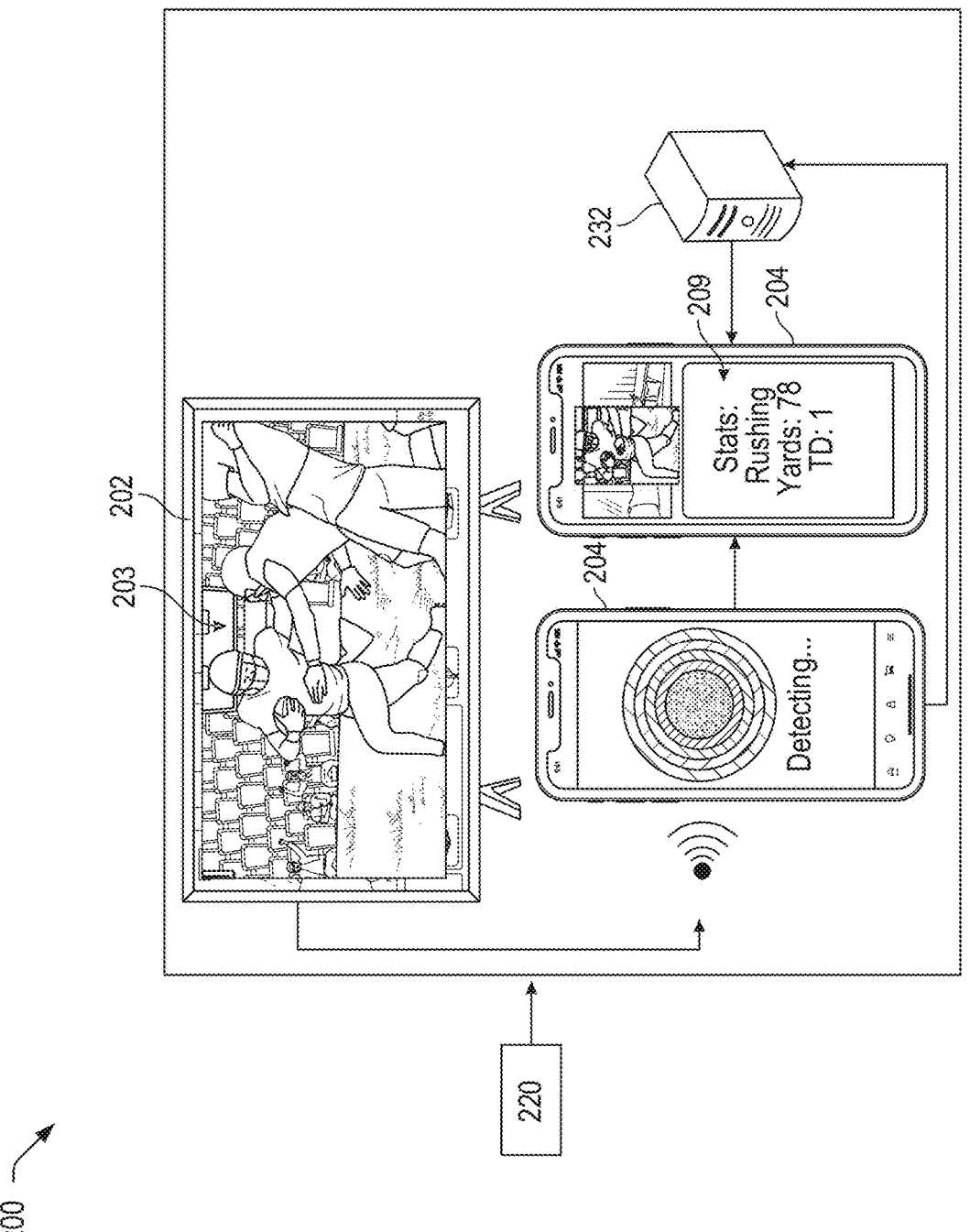

FIGS. 2A-2B depict another example use case 200 for presenting secondary content. The use case 200 occurs in a similar context as the use case 100 and includes similar elements. For example, the use case 200 also shows a user 206 lounging within a residential setting (for example, a living room) and viewing primary content 203 through a first device, which is also a television 202. However, in this use case 200, the primary content 203 being presented via the television 202 is a live sporting event instead of a live stream. The first scene 210 also shows that the user 206 is interacting with a second device, which is also shown as being a smartphone 204.

In the scene 220, the user 206 again selects the icon 207 to cause the smartphone 204 to begin processing audio output by the television 202. The smartphone 204 may also be processing the audio to identify a particular tone or tones that may be embedded within the audio. Similar to the use case 100, once a tone is identified by the smartphone 204, it may be decoded to determine a token that may be used to identify a timestamp of the primary content. This timestamp may be provided (and/or any other identifying information) to the system 232. The system 232 may provide an indication of the secondary content associated with that particular timestamp such that the appropriate secondary content is presented via the smartphone 204.

Instead of the secondary content 209 being product information as in the use case 100, the secondary content 209 in the use case 200 includes player statistics for a player currently involved in a play being shown in the live sporting event on the television 202. The use case 200 illustrates that the type of secondary content 209 that is presented via the second device 104 may not necessarily be limited to information about products being presented via the primary content 203, as shown through the use case 100 of FIGS. 1A-1B. Instead, the secondary content may include any other number of different types of content. Additionally, the secondary content that is presented may be based on any number of different types of factors.

A first example of such a factor may include the type of primary content being presented on the first device. This factor is exemplified through the distinctions between the use case 100 and the use case 200. That is, if the primary content is a television show, then the secondary content may include plot and character information, product information, etc. If the primary content is a sporting event, the secondary content may include player and team statistics and scores, fantasy points produced by the players, and product information (such as player jerseys, etc.).

A second example of such a factor may include a type of application that a user opens via the secondary device. For example, if the user opens an online retail shopping application as shown in use case 100, it may be determined that the user is more interested in viewing information about products shown in the primary content. However, if the user opens a sports application that shows various scores and other information about games being played, then it may be determined that the user is more interested in viewing game scores and player statistics rather than information about products. As yet another example, if the user opens a nutritional application or cooking application, it may be determined that the user is interested in viewing recipes or information about meals or ingredients shown in the primary content.

A third example of such a factor may include historical user preferences. For example, if historical data associated with a first user indicates that the user more often browses online retail shopping applications to purchase products, then it may be determined that the user is more likely to desire to view secondary content relating to products. However, if historical data associated with a second user indicates that the user more often browses a fantasy football application, then it may be determined that the second user is more likely to desire to view similar secondary content. Any other types of historical data may also be used in such a manner. This data is obtained based on user permissions.

Additionally, as aforementioned, the user may specifically indicate the type of secondary content they desire to view. That is, as part of the input to trigger the process of the second device listening for audio from the first device, the user may indicate the type of secondary content they desire to view via the second device. For example, the user may provide a voice command "show me information about the product being shown," "show me the score for the women's finals match at the U.S. Open," or simply "show me the score" (or any other voice command). In some instances, the application on the second device may also prompt the user to confirm the type of secondary content to be presented or may provide a selection of available types of secondary content from which the user may select. In such instances, the secondary content that is presented may be based on the user selection.

Figure 3:
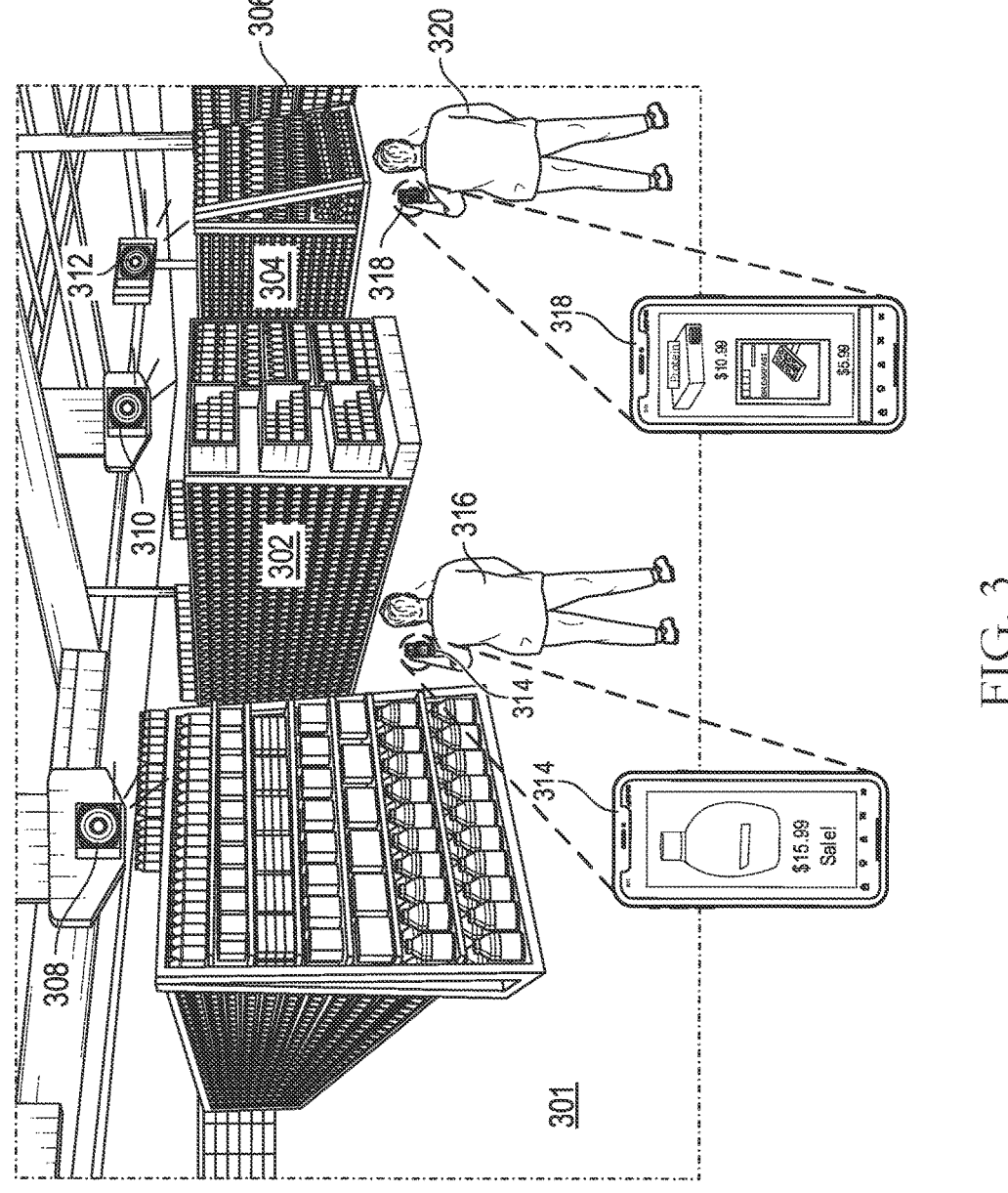
FIG. 3 depicts another example use case for presenting secondary content in accordance with one or more example embodiments of the disclosure.

FIG. 3 depicts another example use case 300 for presenting secondary content. The use case 300 illustrates a different context in which the systems and methods described herein may be applied. Particularly, the use case 300 depicts a scene within a grocery store 301 in which a first aisle 302, second aisle 304, and third aisle 306 are shown. Each of the different aisles includes different types of products that a user (for example, users 316 and 320) may purchase. Each of the aisles includes an associated first device, which, in this particular use case 300, is a speaker. For example, the first aisle 302 includes speaker 308, the second aisle 304 includes speaker 310, and the third aisle 306 includes speaker 312. Each of the speakers may be configured to continuously or periodically emit tones, similar to the tones emitted by the televisions 102 and 202 in use cases 100 and 200. The configuration of the speakers is merely exemplary and any other number of speakers may be provided in the grocery store 301 as well.

In this example, the tones may be processed by devices associated with users in the grocery store (such as smartphone 314 associated with user 316 and smartphone 318 associated with user 320). For example, the users 316 and 320 may be viewing a dedicated application for the grocery store 301 on the smartphones 314 and 318 and may provide an input triggering the smartphones 314 and 318 to process audio produced by the speakers 308, 310, and 312 in the grocery store 301. The input may include any suitable input described with respect to the use case 100-200 or otherwise, such as a selection of an element via the application, a voice command, etc. The smartphones 314 and 316 may also be configured to automatically process audio produced by the speakers 308, 310, and 312 when the dedicated application for the grocery store 301 is open on the smartphones 314 and/or 318. The secondary content may also be presented to the users 316 and 320 via the smartphones 314 and 318 without requiring the use of a dedicated application as well.

Similar to the use cases 100 and 200, the audio emitted by the speakers 308, 310, and 312 may include tones that include embedded information. When the tones are identified and decoded, the decoded data may be used to determine secondary content to present via the smartphones 314 and/or 318. The secondary content in this context may pertain to the contents of the individual aisles, such as names and images of products the users may find on the shelves of the individual aisles, product prices, ingredients, nutritional information, information about sales ongoing for particular products located on the aisles, etc. For example, the smartphone 314 is shown as presenting secondary content relating to the contents of the first aisle 304, which includes laundry detergent and similar products. The smartphone 314 shows that a specific type of detergent is currently on sale. The smartphone 318 is shown as presenting similar secondary content relating to the contents of the second aisle 306, which includes nutritional bars and similar products.

Given that the time within the primary content is not as relevant in the context of use case 300, the information determined based on the decoded token may simply include an identifier that is used to identify the particular aisle associated with the speaker. The identifier may be provided in any form, such as a numerical value or string indicating the aisle associated with the tone or any other type of identifier.

The use case 300 exemplifies that the systems and methods may not necessarily be limited to devices included in the context of a residential home but may also be applicable in any other context. The use case 300 also exemplifies that the first device that produces the audio including embedded tones detected by the second device may not necessarily need to be a device that is configured to display video content. For example, the use case 300 shows that the first device may be a speaker that only outputs audio. Further, the use cases 300 illustrates that the information that is encoded within the tones may not necessarily always be timestamps but may also include any other types of information that may be used to identify secondary content to present via the second device.

Figure 4:
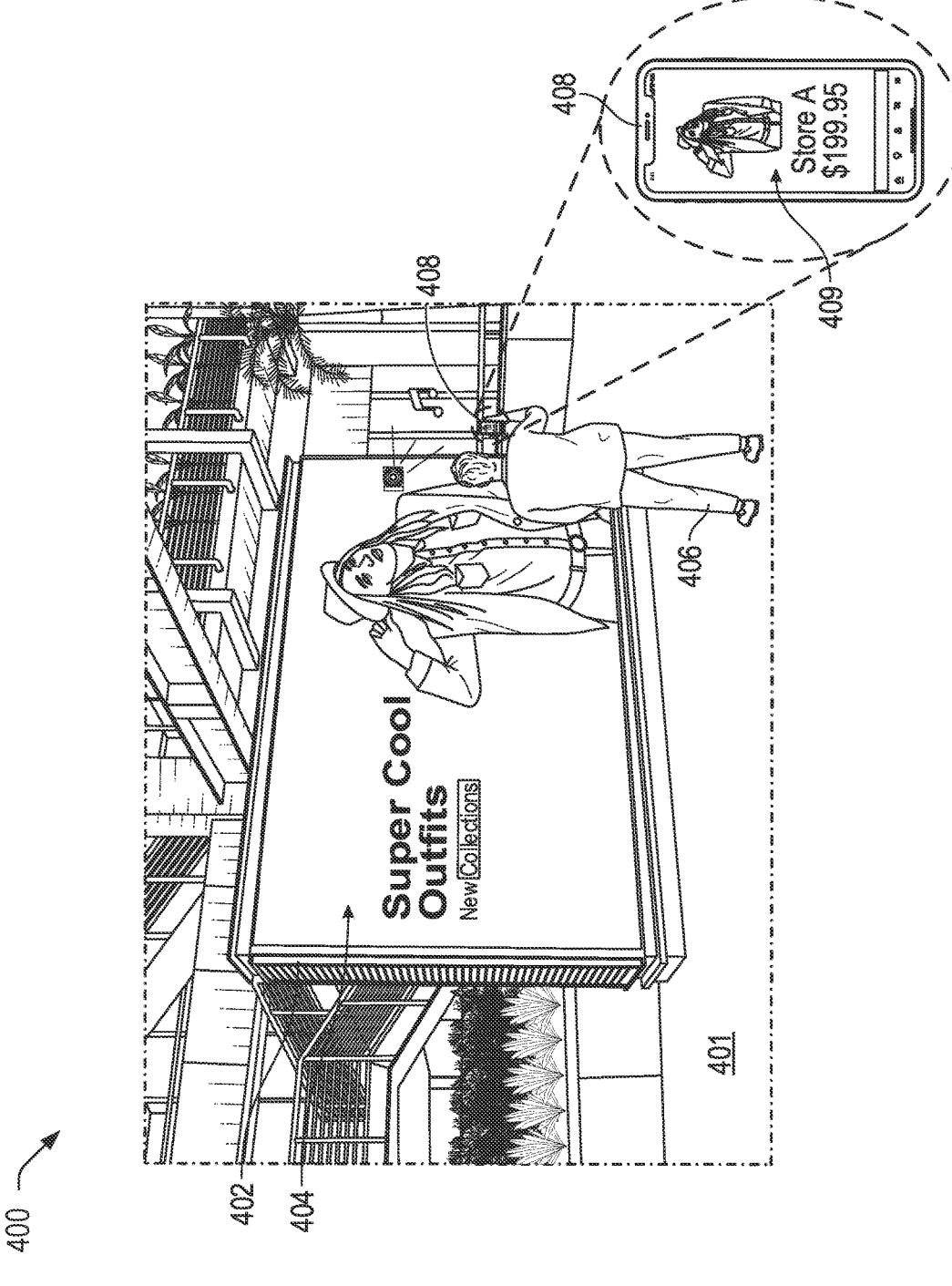
FIG. 4 depicts another example use case for presenting secondary content in accordance with one or more example embodiments of the disclosure.

FIG. 4 depicts another example use case 400 for presenting secondary content. The use case 400 further illustrates that the systems and methods described herein may not necessarily be limited to any particular context or any particular type of device. In the use case 400, a user 406 is shown as walking through a shopping mall 401. The user 406 is walking by a digital billboard 402 displaying an advertisement 404 (e.g., primary content). The digital billboard 402 also includes speakers and (similar to use cases 100-300) continuously or periodically emits one or more tones that may be detectable by a smartphone 408 of the user 306.

In this example, the user 406 desires to view additional information about the product being presented through the advertisement 404. For example, the user 406 may desire to determine the store within the mall that sells the product, the price of the product, the materials included within the product, and/or any other relevant information. Similar to the use cases 100-300, the user 406 in the use case 400 may provide an input to the smartphone 408 (for example, to an application of the smartphone 408) that causes the smartphone 408 to begin processing audio outputs produced by the digital billboard 402 (e.g., "listening" for audio). The smartphone 408 may then detect the audio signal produced by the digital billboard 402 and may process the audio signal to determine that the tone is present within the audio signal. Based on the tone, the smartphone 408 may determine (or be provided an indication from a remote computing device) to present secondary content 409 associated with the advertisement 404 being presented on the digital billboard 402.

In any of the use cases 100-400, continuous synchronization may be performed. For example, in the use case 300, once one of the smartphones 314 and/or 318 identifies a tone produced by one of the aisles and presents secondary content associated with that aisle, the smartphone may continue to process audio signals. As the user walks from one aisle to another aisle, the smartphone may detect another tone produced by a speaker associated with that aisle and may update the secondary content presented via the smartphone. That is, the smartphone may not necessarily cease processing audio and presenting secondary content after one tone is identified and one piece of secondary content is presented. This same continuous synchronization may also apply to any other use case described herein or otherwise.

Figure 5B:
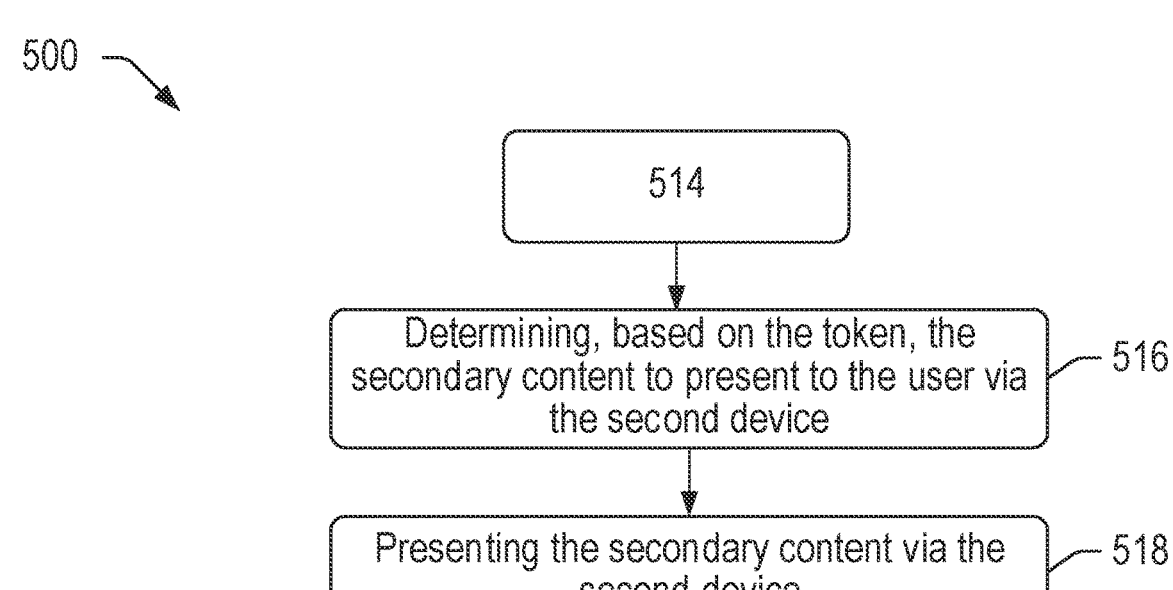

FIGS. 5A-5B depict a flow diagram 500 illustrating example operations associated with presenting secondary content. Particularly, the flow diagram 500 provides a more comprehensive description of the operations involved in presenting the secondary content.

The flow diagram 500 begins with operation 502, which involves mapping secondary content with identifying information associated with the primary content. "Mapping" may refer to creating associations between secondary content and identifying information such that when identifying information is determined after decoding a token from a tone included within the primary content, the secondary content associated with that identifying information may be determined and presented to the user. This mapping may be performed in any suitable manner, such as adding entries to a database (such as described with respect to FIG. 7) and/or through any other suitable method.

In embodiments, the mapping may involve performing a direct mapping between a numerical value associated with the token and the secondary content. However, in other embodiments, the identifying information may be determined using the numerical value associated with the token and the mapping may be performed between the identifying information and the secondary content. The mapping may also be performed in any other suitable manner.

As aforementioned, the primary content may include any type of content, such as a movie, television show, advertisement, content stream, live sports event, etc. The primary content also does not necessarily need to include video content. For example, the primary content may also include a podcast, radio broadcast, radio advertisement, etc.

The term secondary content may be any content that is associated with the primary content. As a few non-limiting examples, the secondary content may include product information for a product being presented during a movie or television show (as well as purchase options for the product), cast and plot information for a movie, player or team statistics associated with a live sports event, a recipe associated with a meal being prepared during a cooking show, and/or any other types of content. That is, the secondary content may allow the user to view additional information about the primary content, provide purchase options for the user to purchase products shown in the primary content, etc. The secondary content may also allow the user to interact with the primary content. Even further examples of secondary content may include interactive comments and chats, trivia questions, product reviews, musical soundtracks, interactive content (such as live voting for contestants during a singing competition television show), a recipe for a meal being cooked in a cooking show, travel information for a locale being shown in a travel show, information about flights to the locale in the travel show, a "choose your own adventure" interactive experience with primary content, etc.

In embodiments, the secondary device and/or secondary content may also assist a user in discovering additional primary content. For example, recommendations may be provided for additional primary content for the user to view, such as related television shows, etc.

In embodiments, individual primary content may be associated with multiple options for secondary content (including different types of secondary content). For example, if the primary content is a movie or television series, secondary content may include, for example, purchasable products featured in the movie or television series; purchasable products related to the movie or television series; merchandise and branded experiences; music featured in the movie or television series; information about the cast, crew, and characters; trivia related to cast, crew, and characters; advertisements; content review; an option to add the movie or television series to a watch list; an option to share the movie or television series with friends; a community forum; etc.

As another example, if the primary content is a cooking show, secondary content may include, for example, purchasable products featured in the cooking show, purchasable products related to the cooking show, recipes featured in the cooking show, an option to add a meal to a meal plan, alternative ingredient listings, content reviews, recipe ratings, a community forum, related tips and videos with further instructions, etc.

As yet another example, if the primary content is a sporting event, the secondary content may include, for example, purchasable products featured in the game, purchasable products related to the game, merchandise and branded experiences, exclusive deals for game viewers, music featured in the game, sports betting opportunities, sports trivia related to the game and/or players, sports statistics related to game, teams, and/or players, content related to advertisements featured within the game, live chats, community forums, etc.

These are merely examples and primary content may include any number of associated secondary content and any variation in types of secondary content available for that primary content.

In embodiments, the mappings between the secondary content and identifying information for given primary content may be manually performed by a user. For example, an entity producing a television show may indicate that products available for purchase are shown at various times within the television show.

In further embodiments, some or all of the mappings may be performed automatically (for example, by computing device 720 and/or any other device or system described herein). That is, the primary content may be automatically processed to determine secondary content that may be associated with the primary content. For example, the system can automatically detect a product within the primary content using image analysis techniques, such as image segmentation and/or neural network classifiers. The system can have a database of products and can use that database to identify the product. A mapping may then be created indicating that secondary content including product purchase information for the product is associated with a particular timestamp. As aforementioned, the mapping may also be performed in association with other types of information, such as a numerical value represented by a token. The secondary content that may be associated with the primary content may also be automatically determined in any other suitable manner.

Operation 504 involves embedding a tone including a token (which may be a numerical value or may also be provided in any other form) within the original audio of the primary content. The token may be mapped to one or more frequencies that may represent the frequencies produced by the primary device when presenting the audio of the primary content (that is, a mapping may exist between the one or more frequencies and the value of the token, as well as the value of the token and/or the identifying information and the secondary content). In some instances, the token may not necessarily be mapped to one or more frequencies directly but may be mapped to values representing the frequencies. The tone may be a unique audio signal that is not originally included within the audio associated with the primary content. For example, if the primary content is a television show, the tone may be an audio signal that is not originally included within the audio for the television show (e.g., character dialogue, soundtrack, etc.). The tone may be generated such that it is distinguishable from the audio associated with the primary content; while the primary content is being presented to the user. That is, the tone is generated such that a second device that is "listening" for such tones (e.g., processing audio produced by the first device presenting the primary content) may identify the tone within the audio and distinguish the tone from the original audio of the primary content.

In embodiments, the tone may include a frequency that is not perceivable by humans (or not perceivable by most humans). For example, the tone may include a frequency in the range of 18.5-19.5 kHz. In this manner, the embedded tones may be detectable by the second device without impacting the viewing experience of the user (for example, the user may not be able to hear the tone; even though it is being emitted as an audio signal by the first device along with the primary content).

In embodiments, the first device (and/or any other device or system) may provide the capability for the user to disable the output of the tones along with the audio of the primary content. For example, given that the tones may be associated with a frequency or range of frequencies that are discernable by some humans, a user who is able to hear the tones may not desire to enable the feature. In some instances, the first device (and/or any other device or system) may also provide calibration capabilities so that the user may provide an indication of a frequency that they are unable to discern. For example, during the calibration process, the first device may output a tone of a particular frequency and then may prompt the user to indicate if they heard the tone. This process may continue until the user indicates that they did not hear a tone output by the first device. The frequency (or range of frequencies) associated with this tone may then be the frequency that is used for the tones that are embedded within the audio associated with the secondary content.

In embodiments, the tone may be generated using frequency-shift keying (FSK). FSK is a frequency modulation technique in which the frequency of a carrier signal varies according to digital signal changes. The tone may also be produced using any other suitable method as well.

Any number of such tones may be encoded within the primary content that is presented to the user via the first device. In embodiments, tones may be periodically embedded within the primary content, and each tone may be associated with a unique token. Thus, when the second device identifies a tone within the audio the tone may be decoded to obtain that particular token to determine which secondary content to present to the user via the second device (e.g., the secondary content mapped to that timestamp).

Operation 506 involves presenting the primary content via a first device. As aforementioned, the first device may be any type of device configured to present primary content to a user. For example, the first device may be a television, desktop or laptop computer, tablet, digital billboard, etc. Use cases 100-400 provide non-limiting examples of different types of devices (for example, the televisions inside the residential homes in use cases 100-200, the speakers in the grocery store in use cases 300, the digital billboard in the use case 400, etc.).

Operation 508 involves receiving, via a second device, user input indicative of a desire to view secondary content associated with the primary content currently being presented. For example, as described with respect to the use case 100, a user may select an icon presented on an application of the second device to indicate a desire to view secondary content on the second device that relates to the primary content being presented on the first device. For example, a product may be presented via the primary content, and the user may desire to view information about the product and/or potentially purchase the product. The user may also provide an input indicative of a desire to view secondary content using any suitable mechanism. As another example, the user may provide a voice command to the second device, such as "show me information about this product." The user may also provide any other type of input to trigger the processing by the second device.

Operation 510 involves processing, by the second device, audio associated with the primary content that is output by the first device. That is, based on the user input received in operation 508, the second device may begin "listening" for tones included within the audio for the primary content that is output by the first device.

In embodiments, the second device may automatically "listen" for such tones without requiring a user input. That is, in some instances, the processing may be triggered without requiring the user to provide an input intended to directly trigger the processing. For example, the user may open an online retail shopping application but may not explicitly indicate to the second device to begin processing audio from the first device. However, the action of opening the particular application may trigger the second device to begin processing audio from the first device to determine if there are any embedded tones providing an indication of secondary content associated with any products that are sold via the online retail shopping application. If such a tone is identified, the second device may provide a notification of such and prompt the user to indicate if they desire to view information about the product. The user may then indicate a desire to view the information by interacting with the second device, and the application may be re-directed to purchase options for the product.

In embodiments, the second device may be "listening" to all audio, and there may be a software development kit (SDK) associated with the second device (or another device) that is processing the audio for specific inaudible tones (e.g., tones within a given frequency range). While the microphone of the second device may receive a wide array of input sounds, the SDK may be processing the sounds to identify sounds that are within a higher frequency range than typical human conversation (for example, greater than 18.5 kHz). When such a tone is detected, this tone may be decoded to obtain the token that was encoded in the tone (for example, during the encoding process, the value associated with the token may be converted to one or more frequencies that may be produced by the primary device as part of the audio of the primary content). In embodiments, the token may be a numerical value (however, the token may be in any other form other than a numerical value as well). Once the token is obtained by decoding the tone, an identifier (or identifiers) may be obtained based on the token, such as a timestamp, etc. This identifier or identifiers may then be used to identify the secondary content.

Additionally, a third device may be configured to automatically "listen" for tones and may prompt the user regarding secondary content when a tone is identified. For example, the user may have a smart device positioned within a residential home, such as a smart speaker. The smart speaker may automatically be processing audio associated with the primary content to identify any relevant tones. When a tone is identified, the smart device may prompt the user to indicate if they desire to view secondary content (for example, issue an audible alert, etc.). The smart device may also transmit an indication to another device to prompt the user. For example, if the smart device is a smart speaker, the smart speaker may transmit information to a smartphone of the user and the smartphone may then prompt the user regarding the secondary content or may simply present the secondary content to the user. In this manner, the device that is "listening" for the tones may not necessarily be the same device that presents the secondary content to the user.

Operation 512 involves identifying, by the second device, a tone within the audio processed by the second device. As aforementioned, the second device may "listen" for a tone that is within a pre-defined frequency range, such as 18.5 kHz to 19.5 kHz (or any other defined frequency range). Operation 514 involves decoding the tone to determine the identifying information for the tone that was encoded into the tone. For example, in some instances, the identifying information may be a token that includes a numerical value. However, the token may not necessarily be associated with a numerical value but may also be provided in any other format as well.

Operation 516 involves determining, based on the token, secondary content to present to the user via the second device. Once the tone identified within the audio is decoded and the token is obtained, the token may be used to determine identifying information associated with the tone. The identifying information may include any number of different types of information and may depend on the type of primary content. For example, if the primary content is a television show, then the identifying information may include a timestamp and an identifier for the show, such as a name of the show. This is merely exemplary and any other identifying information may also be obtained using the token.

Once the identifying information is obtained, the identifying information may be provided to a system (such as a remote server, for example) that may use the identifying information to identify the relevant secondary content. For example, the system may receive a timestamp associated with the 15-minute point within the primary content and may determine that that particular timestamp is associated with secondary content presenting purchasing information for a product shown in the primary content at that timestamp. In embodiments, the system may include a database (or otherwise have access to a database) including a listing of different types of secondary content and associated timestamps. This is merely one example of a mechanism by which the associations between the secondary content and timestamps may be stored and determined, and any other suitable mechanism may also be used (including using any combination of local and/or remote devices/systems).

Any other types of data may also be provided to the system to facilitate the process of identifying the secondary content. For example, an identifier associated with the primary content may be provided along with the timestamp. As another example, an indication of a particular type of secondary content may also be provided to the system in the scenario that multiple types of secondary content are associated with a single timestamp.

In some instances, multiple pieces of secondary content may be associated with a single timestamp. For example, if the primary content is a live sporting event and the timestamp is associated with a point at which a play is being made during the sporting event, the timestamp may be associated with first secondary content including statistics about the player(s) involved, the teams, etc., the timestamp may be associated with second secondary content indicating a number of fantasy points produced by the player(s)

involved during the play, the timestamp may be associated with third secondary content including a link to a website to purchase a jersey worn by a player involved in the play, etc.

In such scenarios, either some or all of the secondary content may be presented to the user simultaneously or some of the secondary content may be presented to the user instead of other secondary content. In the case of the latter, the particular secondary content to present to the user via the second device may be determined in any suitable manner.

As one example of a manner by which it may be determined which secondary content to present, when the user provides the input to initiate the process of obtaining the secondary content to present to the user, the user may provide an indication of a type of secondary content that they desire to view. For example, if the user provides a voice command, the user may state "show me a jersey for 'Player A'". Based on this input, it may be determined that secondary content relating to the jersey should be presented to the user instead of secondary content relating to fantasy statistics for the player.

As another example, the second device may provide a notification to the user via the second device that multiple types of secondary content are associated with the timestamp at which the process of obtaining secondary content was triggered. The second device may also prompt the user to make a selection of one or more of the different types of secondary content. The secondary content that is presented may then be based on a user selection of the secondary content. As non-limiting examples, the user may select one or more types of secondary content from a drop-down menu or another type of selectable element or may provide a voice command. Continuing the above example of the user viewing a live sporting event, the user may provide an input at a given time during the sporting event indicating that they desire to view secondary content. The system may determine that the secondary content associated with that timestamp includes product information for a jersey of a player and fantasy statistics associated with the player. The second device may provide an indication of these two types of secondary content to the user. The user may then provide an input indicating a desire to view one type of secondary content (or both types of secondary content). The second device may then present one or both types of secondary content based on the indication from the user.

Operation 518 involves presenting the secondary content via the second device. The second device may be any type of device through which the user may view secondary content that is associated with the primary content being presented by the first device. In embodiments, the second device may be a smartphone including an application through which the user may view the secondary content; however, this is not intended to be limiting, and the second device may also include any other type of device, including devices similar to (or the same as) the first device.

The secondary content may be presented to the user via the second device while the user is still viewing the primary content on the first device. In this manner, the user may interact with the secondary content while still viewing the primary content. For example, if the secondary content is product information for a jersey of a player involved in the live sporting event, the user may view information about the jersey and purchase the jersey via the second device while the live sporting event is still being presented to the user via the first device.

FIG. 6 depicts an example method 600 for presenting secondary content. Some or all of the blocks of the process flows or methods in this disclosure may be performed in a distributed manner across any number of devices or systems (for example, user device 701, one or primary devices 710, one or more computing devices 720 and 800, etc.). The operations of the method 400 may be optional and may be performed in a different order.

At block 602 of the method 600, computer-executable instructions stored on a memory of a system or device, such as user device 701, one or more primary devices 710, one or more computing devices 720 and 1300, etc., may be executed to receive, by a first device, an audio signal that is associated with primary content being presented via a second device. At block 604 of the method 600, computer-executable instructions stored on a memory of a system or device may be executed to determine, by the first device, that the audio signal includes a first tone. At block 606 of the method 600, computer-executable instructions stored on a memory of a system or device may be executed to determine, by the first device and based on the first tone, a first identifier within the primary content. At block 608 of the method 600, computer-executable instructions stored on a memory of a system or device may be executed to determine, based on the first identifier, first secondary content associated with the primary content. At block 610 of the method 600, computer-executable instructions stored on a memory of a system or device may be executed to present, via the first device, the first secondary content. At block 612 of the method 600, computer-executable instructions stored on a memory of a system or device may be executed to continue, by the first device and after determining that the audio signal includes the first tone, to process the audio signal associated with the primary content. At block 614 of the method 600, computer-executable instructions stored on a memory of a system or device may be executed to determine, by the first device, that the audio signal includes a second tone. At block 616 of the method 600, computer-executable instructions stored on a memory of a system or device may be executed to determine, by the first device and based on the second tone, a second identifier associated with the primary content. At block 618 of the method 600, computer-executable instructions stored on a memory of a system or device may be executed to determine, based on the second identifier, second secondary content associated with the primary content. At block 620 of the method 600, computer-executable instructions stored on a memory of a system or device may be executed to present, via the first device, the second secondary content.

In embodiments, the method 600 may also include encoding the timestamp within the audio signal using a frequency shift key, wherein determining the first timestamp further comprises decoding the first tone.

In embodiments, the method 600 may also include receiving, by the first device, a user input, wherein receiving the audio signal associated with the primary content is based on the user input.

In embodiments, the method 600 may also include determining, based on the first timestamp, third secondary content that is also associated with the primary content, wherein the first secondary content is presented instead of the third secondary content based on the user input.

In embodiments, the primary content and first secondary content are presented simultaneously. In embodiments, determining the secondary content associated with the primary content further comprises sending the first timestamp and an identifier associated with the primary content to a third device. In embodiments, a frequency of the first tone is between 18.5 and 19.5 kHz.

Figure 7:
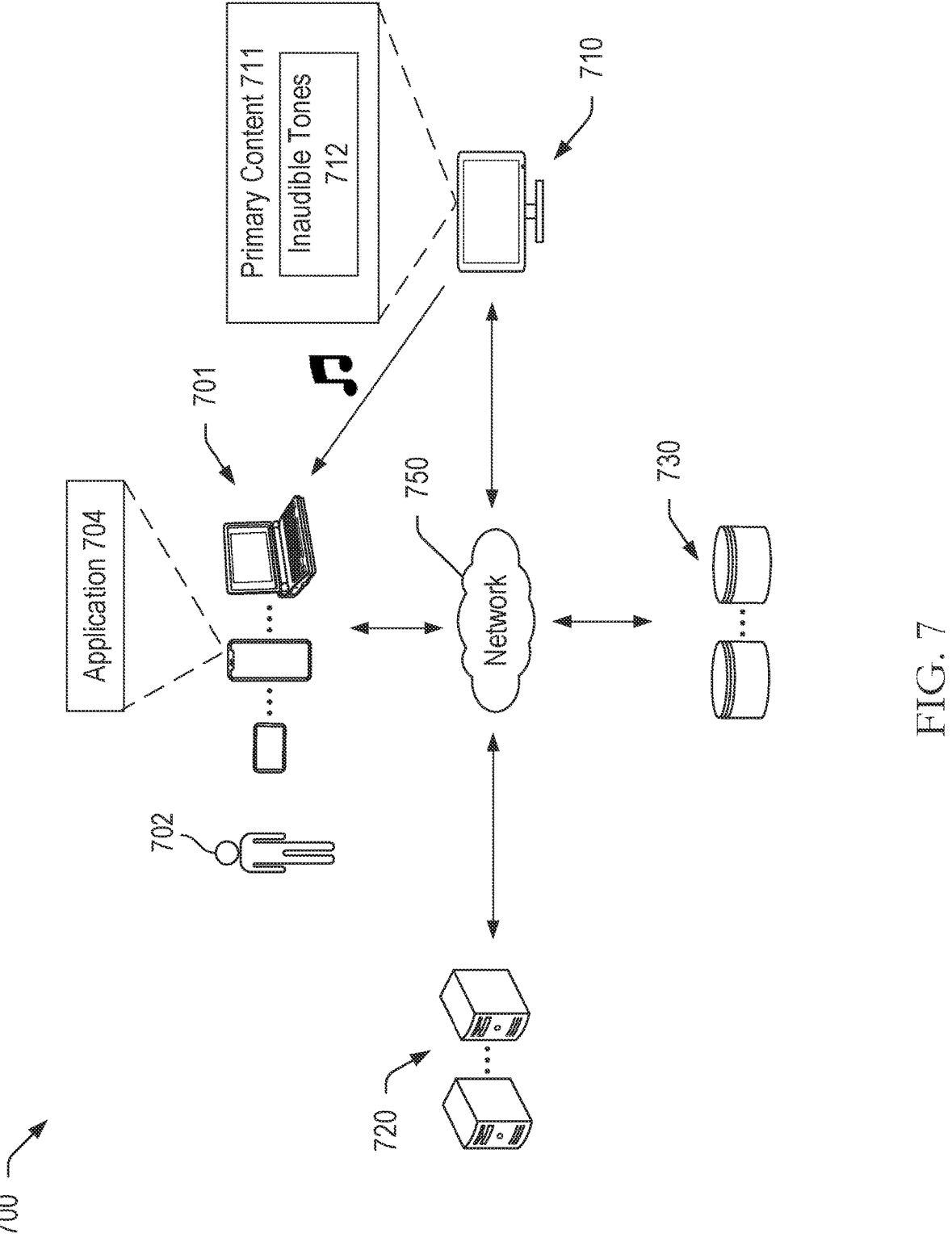
FIG. 7 depicts an example system for generating customized video content in accordance with one or more example embodiments of the disclosure.

FIG. 7 is an example system 700 for presenting secondary content. In one or more embodiments, the system may include one or more user devices 701 (which may be associated with one or more users 702), one or more primary devices 710, one or more computing devices 720, and/or one or more databases 730. However, these components of the system 700 are merely exemplary and are not intended to be limiting in any way. For simplicity, reference may be made hereinafter to a user device 701, primary device 710 computing device 720, database 730, etc.; however, this is not intended to be limiting and may still refer to any number of such elements.

The user device 701 may be any type of device, such as a smartphone, desktop computer, laptop computer, tablet, and/or any other type of device. The user device 701 may be a device that presents secondary content as described herein (for example, the user device 701 may include the smartphone 104 of use case 100, smartphone 204 of use case 200, smartphones 314 and 318 of use case 300, smartphone 408 of use case 400, etc.).

The user device 701 may also include one or more applications 704 used to present the secondary content, which may be any type of secondary content described herein or otherwise. Additionally, the user device 701 may be configured to receive and process audio output by the primary device 710 to identify tones used to determine the secondary content to present on the user device 701, as described herein. To trigger the processing of the audio produced by the primary device 710, the user may provide an input to the user device 701 indicating a desire to view secondary content associated with the primary content being presented by the primary device 710. For example, the user may select an icon via the one or more application 704 indicating an intent for the user device 701 to present secondary content. However, the user 702 may indicate this intent in any other suitable manner, such as a voice command, etc. Additionally, as aforementioned, the user device 701 may be configured to process the audio from the primary content to identify tones without requiring a manual user input as well (for example, based on the user opening the application 704).

The primary device 710 may also include any type of device such as a smartphone, desktop computer, laptop computer, tablet, and/or any other type of device. As described elsewhere herein, the primary device 710 may also include a device that is not necessarily configured to present video content, such as a radio, speaker, etc. The primary device 710 may present primary content 711 as described herein (for example, the primary device 710 may be the television 102 of use case 100; television 202 of use case 200; speakers 308, 310, and 312 of use case 300; digital billboard 402 of use case 400; etc.).

The computing device 720 may be any type of device or system (such as a local or remote server for example) used to perform any of the processing described herein. For example, the computing device 720 may be the same as the systems 132 and 232 shown in use cases 100 and 200. That is, the computing device may receive identifying information (for example, timestamps and/or any other types of identifying information) decoded from tones 712 detected by the user device 701 and may determine secondary content that is associated with the identifying information (for example, based on mappings between identifying information and secondary content in the database 730).

The database 730 may include mappings between different secondary content associated with primary content 711 and identifying information. For example, for a particular television show (a type of primary content), the database 730 may have entries including first secondary content including information about a first product associated with a five-minute timestamp, second secondary including information about a second product associated with a ten-minute timestamp, etc. Thus, when the computing device 720 receives the identifying information decoded from the tone 712 identified by the user device 701, the computing device 720 may reference the database 710 to determine the secondary content that should be presented via the user device 701 based on the timestamp. For example, if the identifying information is a timestamp of five minutes into the television show, then the computing device 720 may determine that the secondary content associated with the first product should be presented to the user 702 via the user device 701. However, the use of the database 730 is merely one example of a method by which the secondary content may be identified using the identifying information decoded from the tone.

In one or more embodiments, any of the elements of the system 700 (for example, one or more user devices 701, one or more primary devices 710, one or more computing devices 720, one or more databases 730, and/or any other element described with respect to FIG. 7 or otherwise) may be configured to communicate via a communications network 750. The communications network 750 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 750 may have any suitable communication range associated therewith and may include, for example, global networks (e.g., the Internet), metropolitan area networks (MANs), wide area networks (WANs), local area networks (LANs), or personal area networks (PANs). In addition, communications network 550 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any of the elements of the system 700 may include any of the elements of the computing device 1300 as well (such as the processor 1302, memory 1304, etc.).

Figure 8:
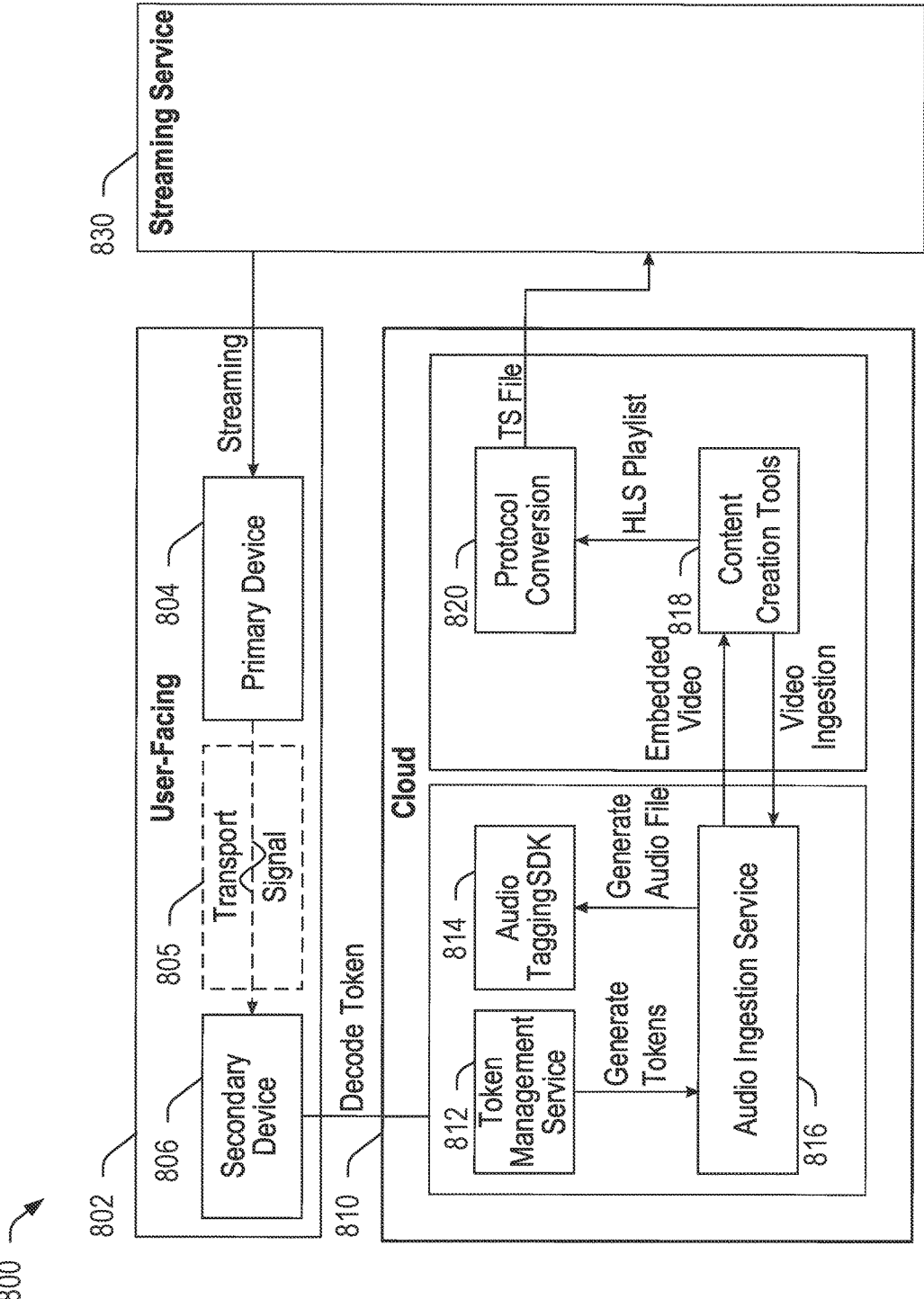
FIG. 8 depicts an example system architecture for presenting secondary content in accordance with one or more example embodiments of the disclosure.

FIG. 8 depicts an example system architecture 800 for presenting secondary content. In embodiments, the system architecture 800 includes one or more user-facing elements 802 (for example, client-side, etc.) and one or more backend elements 810 (for example, server-side, etc.). The system architecture 800 is merely exemplary and the elements of the architecture may be provided at any other location. For example, some of the elements that are shown as being cloud-based may also be user-facing local elements and vice versa. Additionally, any alternative combination of elements at any suitable location (e.g., remote, local, etc.) similarly may be used.

Beginning with the one or more user-facing elements 802 (which may be user-facing devices, for example), the system architecture 800 includes a primary device 804 and a secondary device 806. The primary device 804 and secondary device 806 may be any type of device described herein or otherwise. A signal 805 may be transmitted between the primary device 804 and the secondary device 806. For example, the signal 805 may be audio associated with primary content that is presented via the primary device 804. The audio may include embedded tones that may be decoded to obtain tokens that are mapped to various types of secondary content associated with the primary content, as described herein. In embodiments, the primary content may be streamed via the primary device 804 from a separate streaming service 830; however, this is not required. For example, the streaming service 830 may be a software-as-a-service (SaaS) service providing cloud-managed live and on-demand video infrastructure.

Turning to the one or more backend elements 810, the system architecture 800 may also include a token management service 812, an audio tagging software development kit (SDK) 814, an audio ingestion service 816, one or more content creation tools 818, and/or a conversion mechanism 820. The one or more cloud-based elements may be internet-based services that are hosted on one or more backend servers, for example. However, any of the elements shown as being located on the cloud may also be services hosted on a local device as well (e.g., the user-facing devices, etc.).

The token management service 812 is responsible for generating tokens that may be mapped to secondary content. That is, the token management service 812 may generate a unique token for each individual piece of secondary content. In this manner, each piece of secondary content may be mapped to a unique token such that the token may be used to identify the secondary content to present via the secondary device 806. For example, a mapping between a token and secondary content may be stored within a database; however, the mapping may be performed in any alternative manner as well. In some instances, the token may be a randomized numerical value; however, the token may be any other alternative form as well. The token may be encoded into a tone that is embedded within the audio of the primary content. The secondary device 806 may detect the tone, the tone may be decoded to obtain the token, and the secondary content may be identified using the mapping between the token and the secondary content. Further information about the generation of tokens is provided in at least FIGS. 9 and 10A-10B.

The audio tagging SDK 814 provides the functionalities to process the audio associated with the primary content, including decoding the tones embedded in the audio, as well as generating the audio to be embedded within the primary content. The audio ingestion service 816 is responsible for obtaining the primary content and embedding the tones into the primary content. In embodiments, the secondary device 806 may include a corresponding SDK that may enable the secondary device 806 to detect tones, convert tones to tokens, etc.

The content creation tools 818 may be a service by which users may generate content. The conversion mechanism 820 may optionally involve converting content between various types of streaming protocols. For example, a conversion may be made between a transport stream protocol and a Hypertext Transfer Protocol (HTTP) Live Streaming (HTS) protocol. However, any other conversion may be performed based on the protocols that are used. The content creation tools 818 and the conversion mechanism 820 may be optional within the system architecture 800. In embodiments, the streaming service 830 may be a content delivery network (CDN).

In embodiments, a content creator (e.g., blogger, vlogger, etc.) may use the content creation tools 818 to create audio and video content and then align the audio and video content being provided with product identifiers (e.g., links to products in an online product catalog, etc.).

Figure 9:
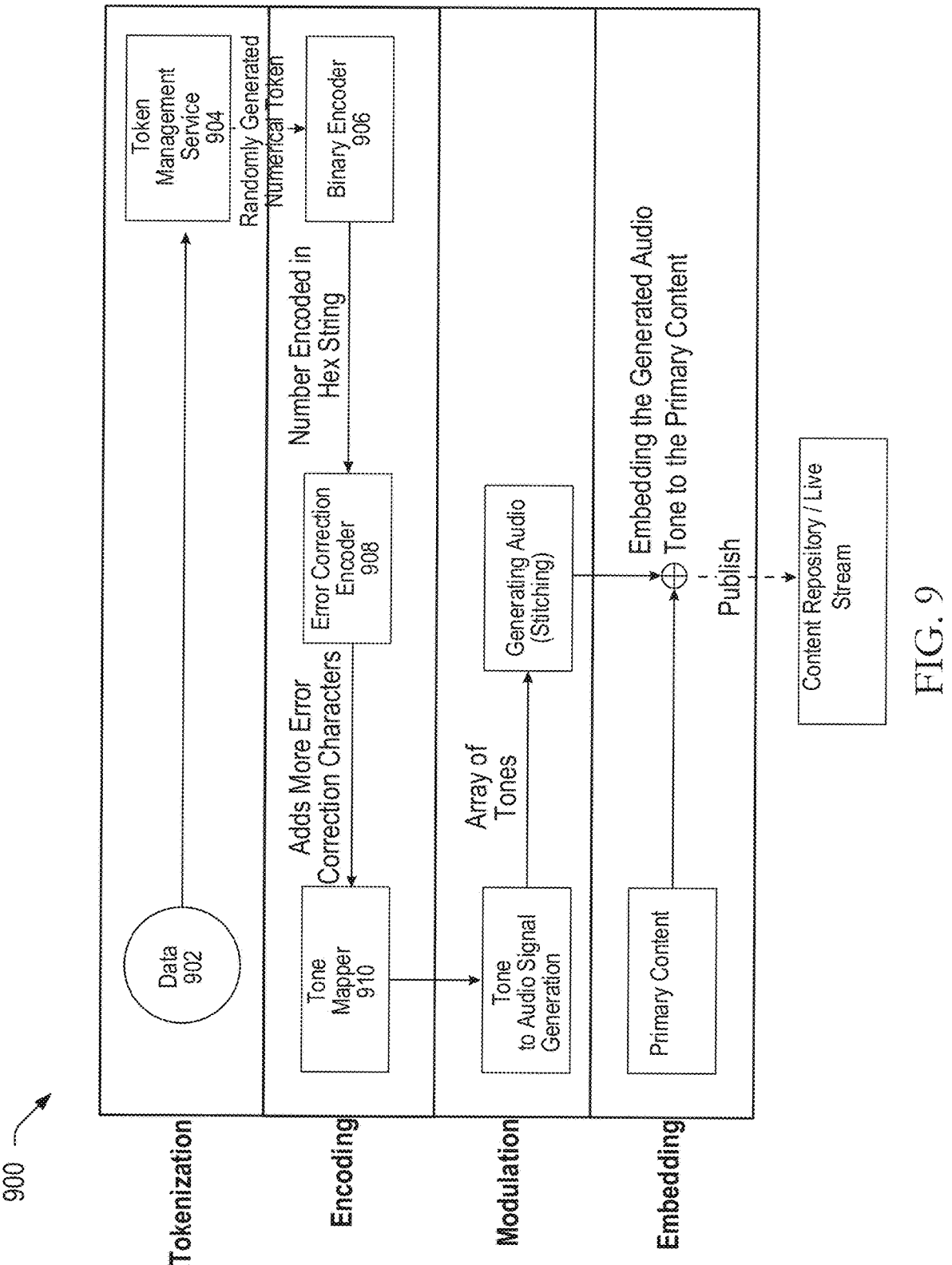
FIG. 9 depicts a flow diagram for tone generation in accordance with one or more example embodiments of the disclosure.

FIG. 9 depicts a flow diagram 900 for tone generation. That is, the flow diagram 900 depicts example operations associated with generating a token, encoding the token into a tone, modulating the encoded tone, and embedding the encoded tone within audio for primary content (with which the audio is presented).

Beginning with the tokenization process, a token management service 904 may receive data 902 and may produce a token based on the data 902. The data 902 may include any type of data that may be mapped to a token within a database, such as any type of secondary content described herein or otherwise. In embodiments, the token may be a randomized numerical value; however, the token may also be provided in any other alternative form, including a non-randomized numerical value, a string, etc. That is, as aforementioned, the token may be a numerical value that is mapped to the data 902 within the database such that the token may be used to identify the particular secondary content to present to a user via a secondary device.

Following tokenization, the encoding process may involve encoding the token and then adding error correction bits to compensate for losses in recovery. In embodiments, the encoding process may involve the use of at least a binary encoder 906 and an error correction encoder 908. The binary encoder 906 receives the token from the token management service 904 and may convert the numerical value into a binary based representation. In embodiments, the binary encoder 906 may be a hex encoder that produces a value encoded in a hexadecimal string. In embodiments, the hex string may be a 16-character hex string; however, any other number of characters may be used. However, any other type of encoder may also be used for the binary encoder 906.

The hexadecimal string may then be provided to an error correction encoder 908. The error correction encoder 908 may add error correction characters to the output produced by the binary encoder 906. In embodiments, the error correction encoder 908 may be a Reed Solomon encoder; however, any other type of error correction encoder may also be used. The use of the binary encoder 906, the error correction encoder 908, etc. is merely exemplary and the encoding may be performed in any other suitable manner using any other type of encoder. For example, error correction bits associated with any other type of error correction may also be generated (Reed Solomon is merely exemplary). In embodiments, a tone mapper 910 generates a digital representation of an audio signal. For example, the toner mapper 910 may produce a digital representation of an audio signal in the form of an array, where each element of the array corresponds to a frequency level. That is, the numerical values associated with the token(s) may be mapped to a spectrum of frequencies, rather than being mapped to a single frequency in some instances (however, a numerical value associated with a token may also be mapped to a single frequency). This array is a digital descriptor that maps message bits to corresponding frequencies.

Following encoding, the modulation process may involve converting the encoded token symbols into acoustic signals that will be transmitted over audio. This signal is a series of audio signal of some predetermined frequencies.

A collection of tones forms a token. In some instances, this token may be audible to a human or an animal. In an example, a duration of the tone during which a signal amplitude of the tone ramps up may be shorter than a threshold. In addition, a duration of the tone during which the signal amplitude of the tone ramps down may also be shorter than the threshold. As an example, the threshold may be one-half of the duration of the tone. Since the ramping up and ramping down are too short, the change in the signal amplitude may be detectable by a human or an animal, which may interfere with the content audio or may just be generally disruptive.

A token is made up of multiple tones (e.g., each tone may be 0.05 seconds and the tone includes 20 tones and, thus, is 1 second long) and is imperceptible to humans or animals. The tone occurs during a time interval (e.g., 0.05 seconds). The signal shaping procedure can ramp up the signal amplitude during a first duration of the time interval (e.g., a first percentage duration between 20 percent and 40 percent of the tone length), remain flat during a second duration of the time interval (e.g., during a next percentage duration between 10 and 30 percent of the tone length), and can ramp down the signal amplitude during a third duration of the time interval (e.g., the last percentage duration between 20 percent and 40 percent of the tone length). Accordingly, the change in the signal amplitude throughout the tone is gradual, so the tone and the collection of tones forming the token may be imperceptible to a human or an animal.

A portion of data 902 is encoded as the tone during the time interval, and another portion of the data 902 is encoded as a tone during another time interval. The tone is also ramped up and down according to the signal shaping procedure. In addition, the signal shaping procedure can set a value for a guard time between the time intervals. The signal shaping procedure can set the value such that the time interval of the tone is longer than the guard time. Between the end of the token of multiple tones and the start of the next token, there can be a time gap (e.g., between the end of the last tone of the token and the beginning of the first tone of the next token). This time gap can be significantly longer than the duration of the token (e.g., can be between 2 seconds and 3 seconds, whereas the token can be between 0.5 seconds and 1.5 seconds). The ramp up and down time of the amplitude and time gap (and, optionally, the guard time between tones) can be parameters defined by the signal shaping procedure.

In an example, the modulation procedure may be an FSK modulation that encodes metadata on a carrier signal within an 18.5-19.5 KHz range, an 18 KHz to 22 KHz range, and/or any other suitable frequency range.

In an example, the signal shaping procedure can set a limit on frequency hopping in the FSK modulation. The audio signal occurs during a time interval. A first set of bits representing a first portion of data 902 is encoded using a first frequency as a first tone. In addition, a second set of bits representing a second portion of metadata is encoded using a second frequency as a second tone. A frequency hop occurs between the first frequency of the first tone and the second frequency of the second tone. The signal shaping procedure can set a frequency hop limit between the first frequency of the first tone and the second frequency of the second tone. For instance, the frequency hop limit may be 60 Hz. So, the frequency hop between the first frequency of the first tone and the second frequency of the second tone can be less than or equal to 60 Hz. In addition, any other frequency hops in the audio signal can also be less than or equal to 60 Hz. In some instances, the frequency hop limit may be between 50 Hz and 150 Hz. The frequency hop limit can be specific to a tone.

In an example, the signal shaping procedure can also set a limit on a bandwidth of the FSK modulation. The limit is a frequency bandwidth limit associated with encoding bits representing metadata during the time interval of the audio signal. As an example, the frequency bandwidth limit may be ten times the frequency hop limit. So, if the frequency hop limit is sixty Hz, then the frequency bandwidth limit may be 600 Hz. In some instances, the bandwidth 805 may be between 500 Hz and 7590 Hz. The bandwidth can be specific to a token, rather than to a tone.

Additional information about the modulation process (as well as other information associated with the encoding and/or decoding of the tones) may be found within U.S. application Ser. No. 18/370,494 filed Sep. 20, 2023, which is incorporated herein by reference. The modulation may also be performed in any other suitable manner and is not intended to be limited as described herein.

Finally, turning to the embedding process, output of the modulation process may be embedded within primary content. The resulting primary content including the embedded tones may then be stored within a content repository if the content is stored content. If the content is live content (such as a live sports event, etc.), then the embedding process may be performed in real-time.

Figure 10A:
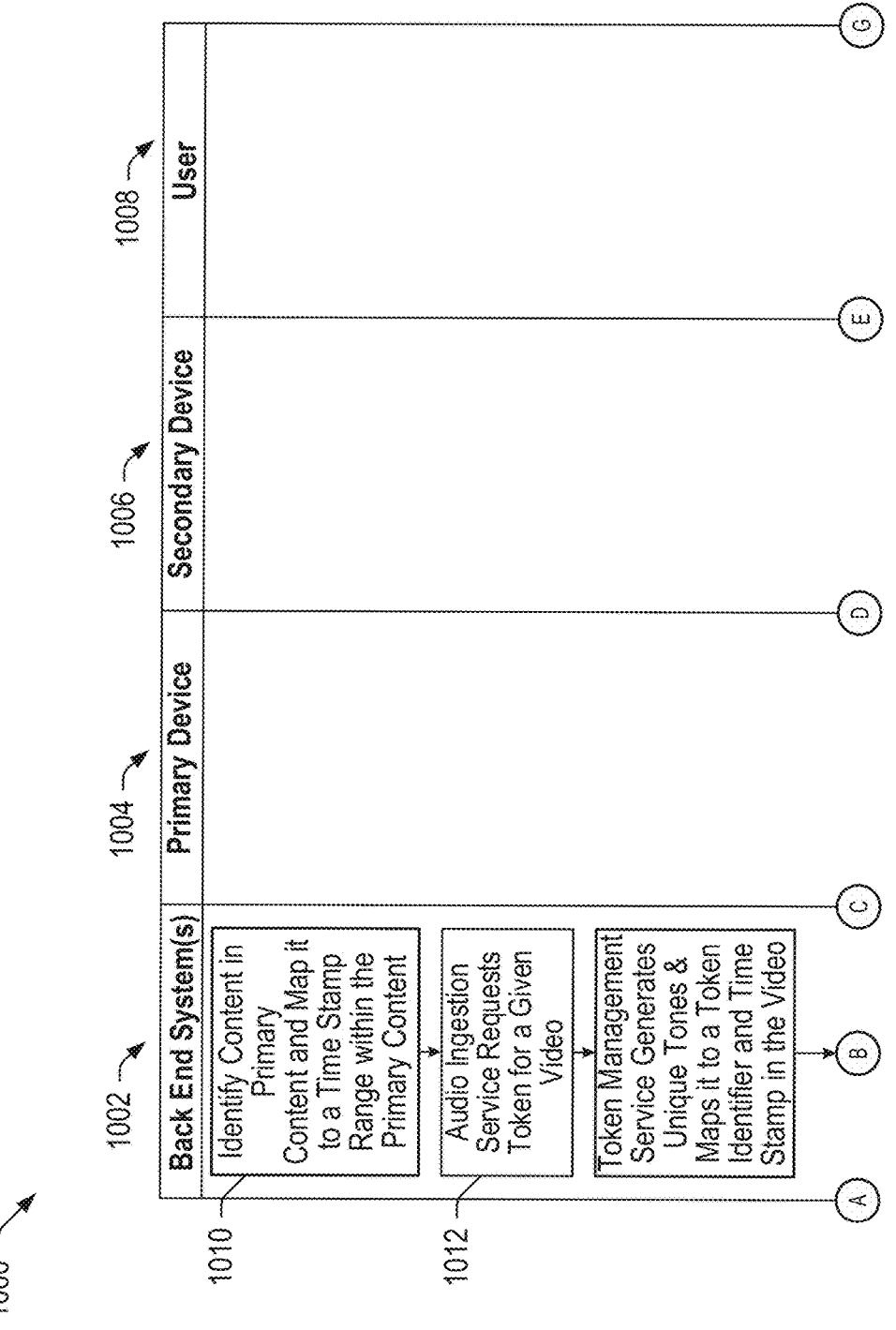
FIG. 10A-10B depict a swim lane diagram for presenting secondary content in accordance with one or more example embodiments of the disclosure.
Figure 10B:
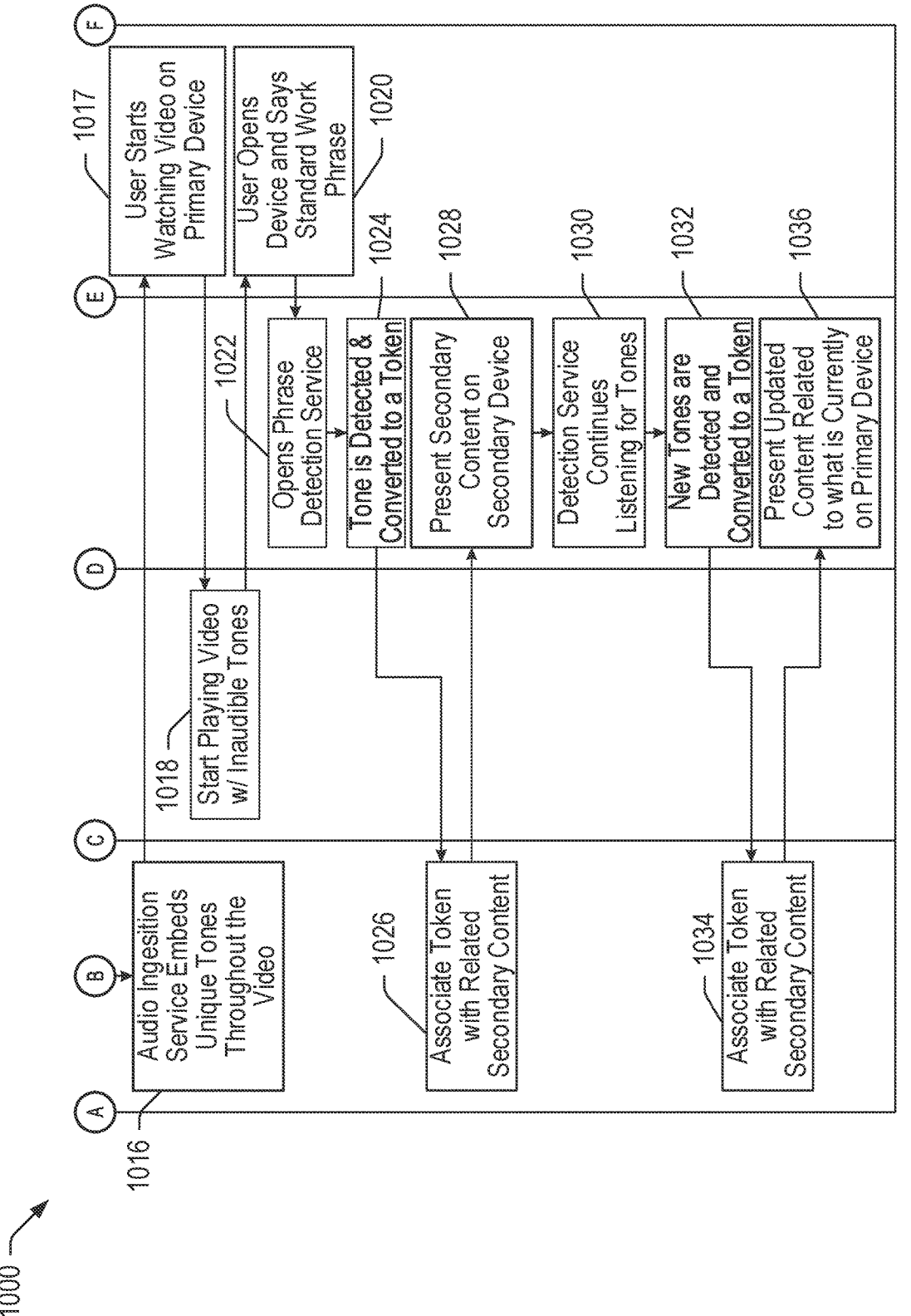

FIG. 10A-10B depict a swim lane diagram 1000 for presenting secondary content. Particularly, the swim lane diagram 1000 presents operations associated with a comprehensive process for generating tokens to associate with secondary content, embedding the tokens within audio for primary content, detecting the tokens by a secondary device, presenting the secondary content via the secondary device, etc. In embodiments, the operations presented in the swim lane diagram 1000 may involve interactions between one or more backend system(s) 1002, one or more primary device (s) 1004, one or more secondary device(s) 1006, and one or more user(s) 1008. For simplicity, reference may be made to a backend system 1002, primary device 1004, secondary device 1006, and user 1008; however, multiple of such elements may similarly be applicable.

Beginning with operation 1010, the backend system 1002 identifies secondary content associated with given primary content and maps the secondary content to a time stamp range within the primary content.

In some instances, the identification of the secondary content may be performed automatically by the backend system 1002. For example, the backend system 1002 may identify that a particular type of product is shown at timestamp 14:00 within a cooking television show. However, a user may also manually indicate different types of secondary content that are associated with the primary content. That is, the secondary content that is associated with the primary content may be pre-established and stored within a database such that when primary content is presented to a user via the primary device 1004, the secondary content associated with that primary content may already be established and stored.

The secondary content may also be identified in real-time if the primary content is live content, such as a live stream produced by an influencer, a live sporting event, etc. That is, the secondary content may not necessarily always be pre-established and stored in a database, but may also be identified as the primary content is being presented via the primary device in real-time. In some instances, a combination of pre-established secondary content and real-time information may be used when live content is being presented. For example, if the content is a live sporting event, then certain pre-established types of secondary content, such as player statistics, fantasy points, etc. may be established and stored. As the sporting event progresses, the pre-established secondary content may be supplemented with information from the live event to presented via the secondary device. For example, it may be pre-established that player statistics may be presented when a football team scores a touchdown; however, it may not be known the specific information that will be presented until this type of event occurs live. This is merely one example of a manner in which secondary content may be determined for a live event and such content may be determined and presented in any other suitable manner.

Operation 1012 involves the backend system 1002 (such as the audio ingestion service shown in FIG. 8) requesting a token for the content identified in operation 1010. Based on the request, the token management service (for example, token management service 812) generates unique tones that are mapped to a token identifier and a timestamp for the primary content. The tokens may be randomly generated numerical values that may be mapped to secondary content within a database. Alternatively, the tokens may be provided in any other form as well.

Operation 1016 involves the backend system 1002 embedding the unique tones within the primary content. In embodiments, the embedding may be performed by the audio ingestion service (for example, audio ingestion service 816). As described with respect to at least FIG. 8-9 (and otherwise), encoding and modulation processes may also be performed prior to the tones being embedded in the audio for the primary content.

Operation 1017 involves the user 1004 viewing the primary content on the primary device 1004. For example, if the primary content is a television show and the primary device is a television, the user 1004 may view the television show via the television. As another example, the primary device may be a laptop computer that is used by the user 1004 to stream a movie.

Operation 1018 involves the primary device 1004 presenting the primary content including the tones. That is, the presentation of the primary content via the primary device 1004 may involve the primary device 1004 emitting the audio associated with the primary content. Given that the tones are embedded within the audio of the primary content, the tones may be output by the speakers of the primary device 1004 as the primary content is presented.

Optional operation 1020 involves the user 1008 performing a trigger action to initiate the process of the secondary device 1006 listening for tones emitted by the primary device 1004. For example, FIG. 10B indicates that the user 1008 may speak a "wake word," which may be a pre-defined word or phrase used to trigger the secondary device 1006 to begin "listening" for certain tones. The trigger action may also involve any other action, such as the user 1008 typing a command into the secondary device 1006, selecting an icon via an application of the secondary device 1006, and/or performing any other type of action to indicate a desire by the user 1008 for the secondary device 1006 to listen for tones. Based on the trigger action, at operation 1022, the secondary device 1006 may being listening for tones, or may begin processing audio associated with the primary content for such tones. However, the secondary device 1006 may also automatically process such audio without requiring the trigger action from the user 1008. For example, the secondary device 1006 may simply always be processing audio to identify tones within a given frequency range (such as any of the frequency range described herein or any other frequency range). As another example, the secondary device 1006 may process audio when it determined that primary content is being presented. As another example, the secondary device 1006 may process audio when it is in a particular location. The secondary device 1006 may also automatically process audio based on any number of other suitable conditions.

Operation 1024 involves the secondary device 1006 detecting a tone emitted by the primary device 1004 (for example, a tone embedded within the audio of the primary content being presented via the primary device 1004). Operation 1024 also involves the detected tone being converted into a token. The conversion process may involve decoding the tone to obtain the token that was previously encoded within the tone. As aforementioned, the token may be a numerical value; however, the token may include information in any other form. The decoding process may, in instances in which the token includes numerical values, involve identifying the frequencies included in the tones and converting the frequencies to numerical values based on mappings stored within a database. However, the decoding process may be performed in any other suitable manner.

Operation 1026 involves determining the secondary content that is associated with the decoded token. For example, a mapping may exist between various tokens and different secondary content within a database. In some instances, the mappings may exist for different primary content. Thus, the backend system 1002 may identify the token and use the mappings to determine the secondary content that is associated with the token for the given primary content. Operation 1028 involves presenting the secondary content via the secondary device 1006. The secondary content may be presented via the secondary device 1006 as the primary content continues to be presented via the primary device 1004. That is, the user 1008 may interact with the secondary content via the secondary device 1006 while simultaneously viewing the primary content via the primary device 1004.

Operation 1030 involves the secondary device 1006 continuing to listen for tones within the audio of the primary content. Operation 1032 involves the secondary device 1006 detecting another tone within the audio of the primary content. Operation 1032 also involves the other tone being decoded to obtain the associated token. Operation 1034, similar to operation 1026, involves determining the secondary content that is associated with the decoded token. Operation 1036 involves presenting the secondary content via the secondary device.

Operations 1030-1038 may continue iteratively until the primary content ceases to be presented by the primary device 1004. That is, continuous synchronization may be performed such that different types of secondary content may continue to be presented via the secondary device 1006 based on the current timestamp of the primary content. In this manner, the approach described herein may provide a synchronized experience of secondary content being presented via the secondary device 1006 that is relevant to the current portion of the primary content being presented via the primary device 1004.

Figure 11:
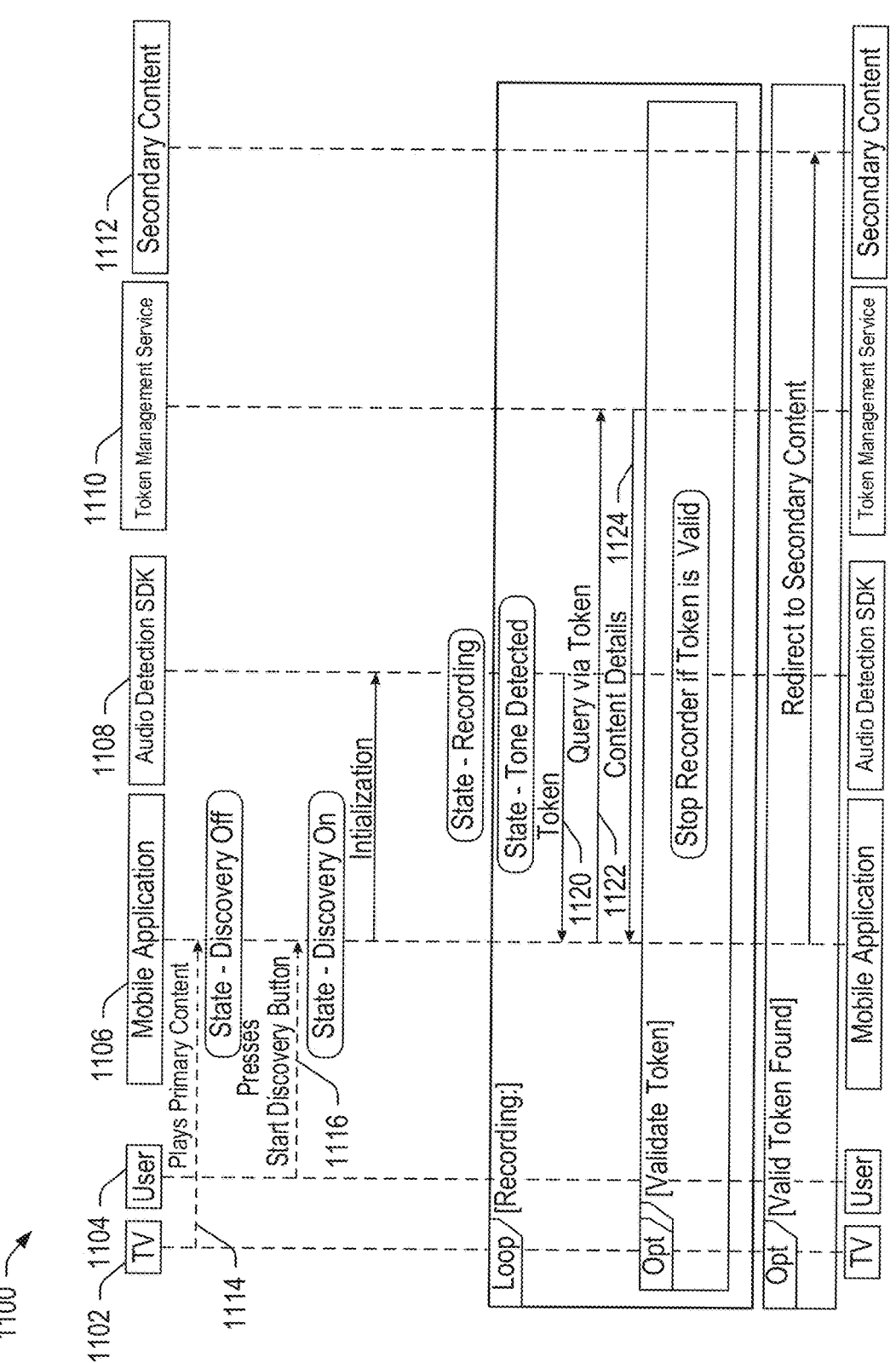
FIG. 11 depicts another flow diagram for tone detection and presentation of secondary content in accordance with one or more example embodiments of the disclosure.

FIG. 11 depicts another flow diagram 1100 including additional details relating to tone detection and presentation of secondary content. The flow diagram 1100 provides a specific example in which the primary device is a television 1102 and the secondary device is a smartphone including a mobile application 1106. However, this is not intended to be limiting and any other type of primary device and secondary device may be used.

At operation 1114, the television 1102 presents primary content, which may be detected by the mobile application 1106 via the smartphone (for example, via a microphone of the smartphone). For example, the primary content may be a television show, movie, live event, and/or any other type of content. However, the smartphone may not necessarily process the primary content (e.g., the audio associated with the primary content) automatically by default. That is, the smartphone may by default be in a "discovery off" state. This may reduce the processing load on the smartphone when the user 1104 does not desire to view secondary content 1112. In such instances the user 1104 may manually trigger the smartphone to begin processing the primary content. For example, at operation 1116, the user 1104 selects an icon presented via the mobile application 1106 to trigger the smartphone to begin processing the primary content (thereby switching the secondary device to a "discovery on" state). However, this process may be triggered in any other suitable manner described herein or otherwise, including automatic triggers. Additionally, in some instances, the smartphone may always be in the "discovery on" state or may be in the "discovery on" state by default unless the user 1104 indicates otherwise.

Once the smartphone is in the "discovery on" state, the audio detection SDK 1108 (which may be the same as audio tagging SDK 814, an SDK that is on a server and configured to run client-side, etc.) is initialized to a "recording" state. The audio detection SDK 1108 provides the functionalities to process the audio associated with the primary content, including decoding the tones embedded in the audio, as well as generating the audio to be embedded within the primary content. In the "recording" state, the audio detection SDK 1108 begins processing audio produces by the television 1102 to identify any embedded tones within the audio.

Once the audio detection SDK 1108 identifies one or more tones within a pre-determined frequency range (which may be any frequency range mentioned herein or otherwise), the one or more tones are decoded to obtain a token that was previously encoded into the audio of the primary content. At operation 1120, the audio detection SDK 1108 provides the token to the mobile application 1106. At operation 1122, the mobile application 1106 sends a query to the token management service 1110 (which may be the same as token management service 812, for example).

At operation 1124, the token management service 1110 determines secondary content 1112 associated with the token provided by the mobile application 1106. For example, a mapping may exist between various tokens and secondary content 1112. The token management service 1110 may then provide an indication of the secondary content 1112 to the mobile application 1106. Optionally, once the token is identified, the audio detection SDK 1108 may cease the recording state. However, the audio detection SDK 1108 may alternatively maintain the recording state and continue to listen for additional tones within the audio of the primary content. This represents one technical benefit of the approach described herein. That is, continuous synchronization between the second device and the television 1102 may be performed, such that secondary content 1112 may continuously be presented via the mobile application 1106 as different portions of the primary content are presented via the television 1102.

In some instances, the secondary content 1112 that is presented may automatically update based on the current portion of the primary content that is being presented using this continuous synchronization mechanism. However, in some instances, the smartphone (or television 1102) may prompt the user when new secondary content 1112 is available, and the user may indicate whether they want to view the secondary content. That is, the secondary content 1112 may not always necessarily automatically present via the smartphone. This may be beneficial if the user 1104 only desires to view some types of secondary content 1112 or desires to continue viewing one type of secondary content 1112, for example. In some cases, the mobile application through which the secondary content 1112 is presented may include settings through which the user 1104 may indicate the manner in which they desire secondary content 1112 to be presented (for example, if they desire the secondary content 1112 to automatically be synchronized and presented, if they desire to be prompted before secondary content 1112 is presented, if they desire to only view certain types of secondary content, etc.).

Figure 12:
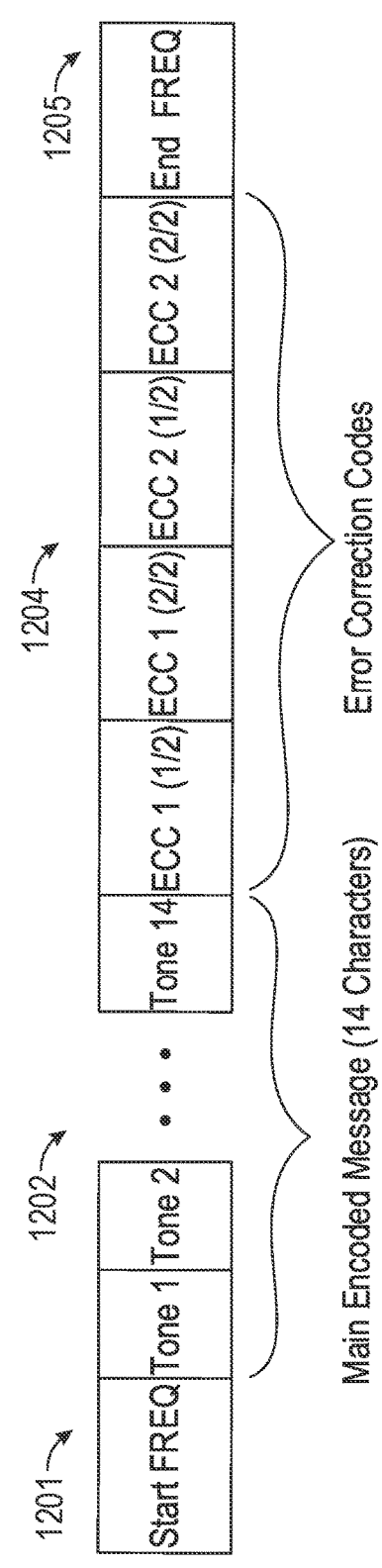
FIG. 12 depicts an example depicts an example audio message in accordance with one or more example embodiments of the disclosure.

FIG. 12 depicts an example audio message 1200. That is, the audio message 1200 may be a message that is embedded in the audio of the primary content. The audio message 1200 is then decoded to obtain a token that is used to determine which secondary content to present via the secondary device.

In embodiments, the audio message 1200 includes at least one or more terminal symbols (such as symbol 1201 and symbol 1205), one or more tones 1202 and one or more error correction codes 1204. The one or more tones 1202 (and/or any other elements of the audio message 1200) may be within a frequency range that is inaudible by humans or nearly inaudible by humans as described herein. However, in some instances, the use of audible frequencies may also be desirable.

In embodiments, the one or more terminal symbols provide an indication of the start and end of the audio message 1200. For example, symbol 1201 indicates the start of the audio message 1200 and symbol 1205 indicates the end of the audio message 1200.

The one or more tones 1202 may include the main information that is transmitted through the audio message 1200. For example, the one or more tones 1202 may be decoded to obtain a token. As described herein, the token may be a numerical value that may be used to determine the secondary content to present via the secondary device (however, the token may be provided in an alternative form other than a numerical value as well). In some instances, the one or more tones 1202 may be mapped to different tokens within a database. In this manner, the decoding process may involve determining the token that is associated with the one or more tones 1202 based on the mapping. However, the decoding process may also be performed in any other suitable manner. Additional details about the encoding and modulation associated with generating the audio message 1200 are provided in FIG. 9.

The error correction codes 1204 are additional bits included within the audio message 1200 that are used to validate the audio message 1200. The error correction codes 1204 may be generated in accordance with any number of error correction mechanisms known in the art. For example, as described with respect to FIG. 9, a Reed Solomon encoder may be used to generate error correction bits. However, this is merely exemplary, and any other form of error correction may also be implemented. The error correction codes 1204 may allow for information to be recovered even if there are corruptions in an original audio message. Any other number of error correction codes 1204 may be included in the audio message 1200.

The audio message shown in FIG. 12 is merely exemplary and the audio message may also be provided in any other suitable format. For example, the audio message 1200 may include any other components in any other suitable order.

Figure 13:
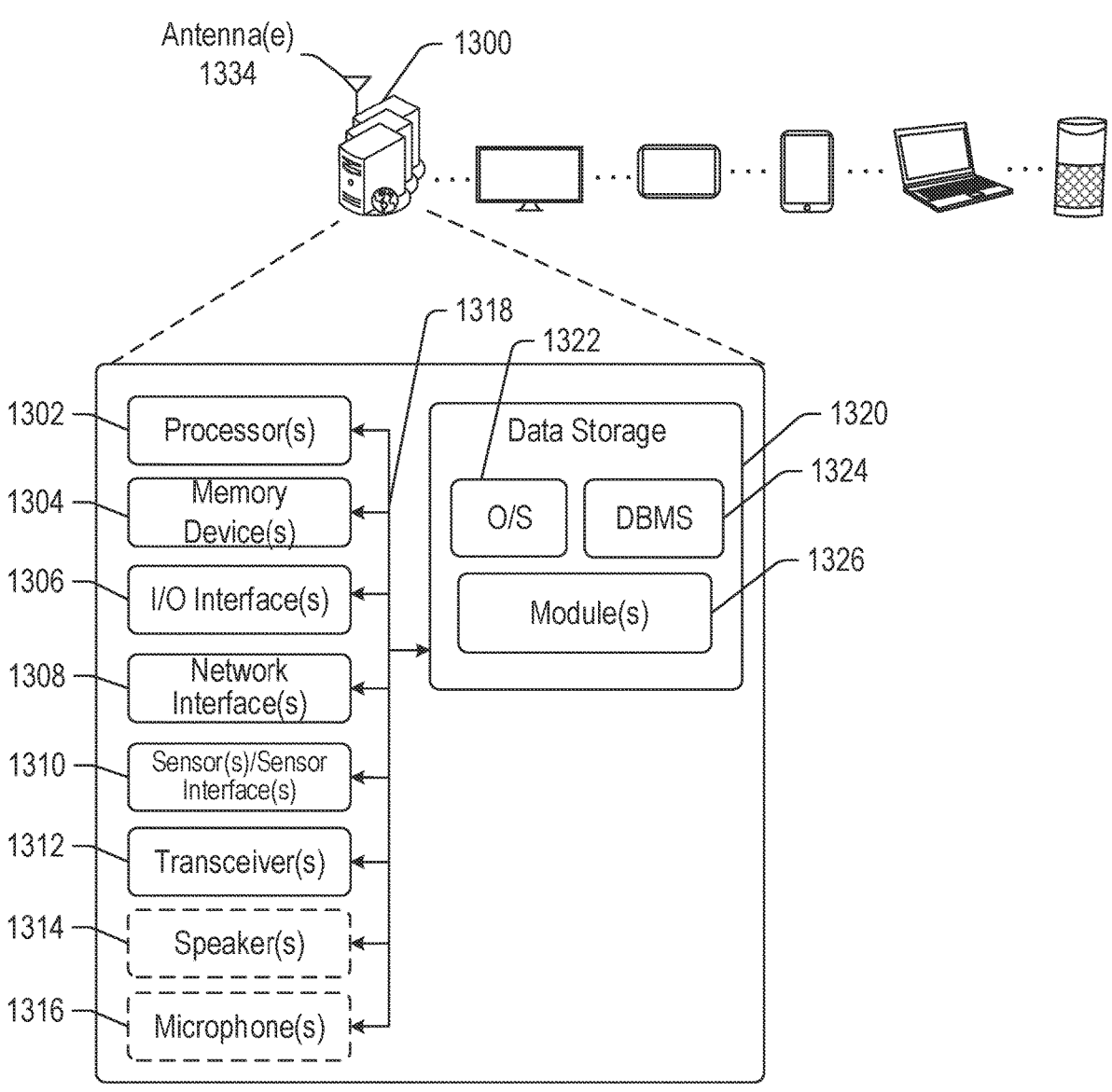
FIG. 13 depicts an example computing device in accordance with one or more example embodiments of the disclosure.

FIG. 13 is a schematic block diagram of an illustrative computing device 1300 in accordance with one or more example embodiments of the disclosure. The computing device 1300 may include any suitable computing device capable of receiving and/or generating data including, but not limited to, a user device, such as a smartphone, tablet, e-reader, wearable device, or the like; a desktop computer; a laptop computer; a content streaming device; a set-top box; or the like. The computing device 1300 may correspond to an illustrative device configuration for the devices of FIGS. 1-12 (such as the user device 701, primary device 710, computing device 720, etc.).

The computing device 1300 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 1300 may include one or more processor(s) 1302, one or more memory devices 1304 (generically referred to herein as memory 1304), one or more input/output (I/O) interface(s) 1306, one or more network interface(s) 1308, one or more sensors or sensor interface(s) 1310, one or more transceivers 1312, one or more optional speakers 1314, one or more optional microphones 1316, and data storage 1320. The computing device 1300 may further include one or more buses 1318 that functionally couple various components of the computing device 1300. The computing device 1300 may further include one or more antenna (e) 1334 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1318 may include at least one of a system bus, a memory bus, an address bus, or a message bus, and may permit exchange of information (e.g., data (including computer-executable code), signaling, etc.) between various components of the computing device 1300. The bus(es) 1318 may include, without limitation, a memory bus or a memory controller, a peripheral bus, an accelerated graphics port, and so forth. The bus(es) 1318 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1304 of the computing device 1300 may include volatile memory (memory that maintains its state when supplied with power), such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1304 may include multiple different types of memory such as various types of static random-access memory (SRAM), various types of dynamic random-access memory (DRAM), various types of unalterable ROM, and/or writeable variants of ROM, such as electrically erasable programmable read-only memory (EEPROM), flash memory, and so forth. The memory 1304 may include main memory as well as various forms of cache memory, such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1320 may include removable storage and/or non-removable storage including, but not limited to, magnetic storage, optical disk storage, and/or tape storage. The data storage 1320 may provide non-volatile storage of computer-executable instructions and other data. The memory 1304 and the data storage 1320, removable and/or non-removable, are examples of computer-readable storage media (CRSM) as that term is used herein.

The data storage 1320 may store computer-executable code, instructions, or the like that may be loadable into the memory 1304 and executable by the processor(s) 1302 to cause the processor(s) 1302 to perform or initiate various operations. The data storage 1320 may additionally store data that may be copied to memory 1304 for use by the processor(s) 1302 during the execution of the computer-executable instructions. Moreover, output data generated as a result of execution of the computer-executable instructions by the processor(s) 1302 may be stored initially in memory 1304 and may ultimately be copied to data storage 1320 for non-volatile storage.

More specifically, the data storage 1320 may store one or more operating systems (O/S) 1322; one or more database management systems (DBMS) 1324; and one or more program module(s), applications, engines, computer-executable code, scripts, or the like such as, for example, one or more module(s) 1326. Any of the components depicted as being stored in data storage 1320 may include any combination of software, firmware, and/or hardware. The software and/or firmware may include computer-executable code, instructions, or the like that may be loaded into the memory 1304 for execution by one or more of the processor(s) 1302. Any of the components depicted as being stored in data storage 1320 may support functionality described in reference to correspondingly named components earlier in this disclosure.

The data storage 1320 may further store various types of data utilized by components of the computing device 1300. Any data stored in the data storage 1320 may be loaded into the memory 1304 for use by the processor(s) 1302 in executing computer-executable code. In addition, any data depicted as being stored in the data storage 1320 may potentially be stored in one or more datastore(s) and may be accessed via the DBMS 1324 and loaded in the memory 1304 for use by the processor(s) 1302 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 13, the datastore(s) may include, for example, purchase history information, user action information, user profile information, a database linking search queries and user actions, and other information.

The processor(s) 1302 may be configured to access the memory 1304 and execute computer-executable instructions loaded therein. For example, the processor(s) 1302 may be configured to execute computer-executable instructions of the various program module(s), applications, engines, or the like of the computing device 1300 to cause or facilitate various operations to be performed in accordance with one or more embodiments of the disclosure. The processor(s) 1302 may include any suitable processing unit capable of accepting data as input, processing the input data in accordance with stored computer-executable instructions, and generating output data. The processor(s) 1302 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1302 may have any suitable microarchitecture design that includes any number of constituent components, such as, for example, registers, multiplexers, arithmetic logic units, cache controllers for controlling read/write operations to cache memory, branch predictors, or the like. The microarchitecture design of the processor(s) 1302 may be capable of supporting any of a variety of instruction sets.

Referring now to functionality supported by the various program module(s) depicted in FIG. 13, the module(s) 1326 may include computer-executable instructions, code, or the like that responsive to execution by one or more of the processor(s) 1302 may perform functions including, but not limited to, performing any functionality associated with the generation of tones, processing of audio to detect tones, encoding and decoding of tones, determining secondary content to present to a user, etc.

Referring now to other illustrative components depicted as being stored in the data storage 1320, the O/S 1322 may be loaded from the data storage 1320 into the memory 1304 and may provide an interface between other application software executing on the computing device 1300 and hardware resources of the computing device 1300. More specifically, the O/S 1322 may include a set of computer-executable instructions for managing hardware resources of the computing device 1300 and for providing common services to other application programs (e.g., managing memory allocation among various application programs). In certain example embodiments, the O/S 1322 may control execution of the other program module(s) to dynamically enhance characters for content rendering. The O/S 1322 may include any operating system now known or which may be developed in the future including, but not limited to, any server operating system, any mainframe operating system, or any other proprietary or non-proprietary operating system.

The DBMS 1324 may be loaded into the memory 1304 and may support functionality for accessing, retrieving, storing, and/or manipulating data stored in the memory 1304 and/or data stored in the data storage 1320. The DBMS 1324 may use any of a variety of database models (e.g., relational model, object model, etc.) and may support any of a variety of query languages. The DBMS 1324 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 1300 is a user device, the DBMS 1324 may be any suitable light-weight DBMS optimized for performance on a user device.

Referring now to other illustrative components of the computing device 1300, the input/output (I/O) interface(s) 1306 may facilitate the receipt of input information by the computing device 1300 from one or more I/O devices as well as the output of information from the computing device 1300 to the one or more I/O devices. The I/O devices may include any of a variety of components, such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 1300 or may be separate. The I/O devices may further include, for example, any number of peripheral devices such as data storage devices, printing devices, and so forth.

The I/O interface(s) 1306 may also include an interface for an external peripheral device connection, such as universal serial bus (USB), FireWire, Thunderbolt, Ethernet port, or other connection protocol that may connect to one or more networks. The I/O interface(s) 1306 may also include a connection to one or more of the antenna (e) 1334 to connect to one or more networks via a wireless local area network (WLAN) (such as Wi-Fi) radio, Bluetooth, ZigBee, and/or a wireless network radio, such as a radio capable of communication with a wireless communication network, such as a Long Term Evolution (LTE) network, WiMAX network, 3G network, ZigBee network, etc.

The computing device 1300 may further include one or more network interface(s) 1308 via which the computing device 1300 may communicate with any of a variety of other systems, platforms, networks, devices, and so forth. The network interface(s) 1308 may enable communication, for example, with one or more wireless routers, one or more host servers, one or more web servers, and the like via one or more of networks.

The antenna (e) 1334 may include any suitable type of antenna depending, for example, on the communications protocols used to transmit or receive signals via the antenna (e) 1334. Non-limiting examples of suitable antennas may include directional antennas, non-directional antennas, dipole antennas, folded dipole antennas, patch antennas, multiple-input multiple-output (MIMO) antennas, or the like. The antenna (e) 1334 may be communicatively coupled to one or more transceivers 1312 or radio components to which or from which signals may be transmitted or received.

As previously described, the antenna (e) 1334 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (e) 1334 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11 g, 802.11n), 5 GHz channels (e.g., 802.11n, 802.11ac), or 60 GHz channels (e.g., 802.11ad). In alternative example embodiments, the antenna (e) 1334 may be configured to transmit or receive radio frequency signals within any suitable frequency range forming part of the unlicensed portion of the radio spectrum.

The antenna (e) 1334 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1312 may include any suitable radio component(s) for—in cooperation with the antenna (e) 1334—transmitting or receiving radio frequency (RF) signals in the bandwidth and/or channels corresponding to the communications protocols utilized by the computing device 1300 to communicate with other devices. The transceiver(s) 1312 may include hardware, software, and/or firmware for modulating, transmitting, or receiving—potentially in cooperation with any of antenna (e) 1334—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1312 may further include hardware, firmware, or software for receiving GNSS signals. The transceiver(s) 1312 may include any known receiver and baseband suitable for communicating via the communications protocols utilized by the computing device 1300. The transceiver(s) 1312 may further include a low noise amplifier (LNA), additional signal amplifiers, an analog-to-digital (A/D) converter, one or more buffers, a digital baseband, or the like.

The sensor(s)/sensor interface(s) 1310 may include or may be capable of interfacing with any suitable type of sensing device, such as, for example, inertial sensors, force sensors, thermal sensors, and so forth. Example types of inertial sensors may include accelerometers (e.g., MEMS-based accelerometers), gyroscopes, and so forth.

The optional speaker(s) 1314 may be any device configured to generate audible sound. The optional microphone(s) 1316 may be any device configured to receive analog sound input or voice data.

It should be appreciated that the program module(s), applications, computer-executable instructions, code, or the like depicted in FIG. 13 as being stored in the data storage 1320 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 1300, and/or hosted on other computing device(s) accessible via one or more networks, may be provided to support functionality provided by the program module(s), applications, or computer-executable code depicted in FIG. 13 and/or additional or alternate functionality. Further, functionality may be modularized differently such that processing described as being supported collectively by the collection of program module(s) depicted in FIG. 13 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model, such as, for example, a client-server model, a peer-to-peer model, and so forth. In addition, any of the functionalities described as being supported by any of the program module(s) depicted in FIG. 13 may be implemented, at least partially, in hardware and/or firmware across any number of devices.

It should further be appreciated that the computing device 1300 may include alternate and/or additional hardware, software, or firmware components beyond those described or depicted without departing from the scope of the disclosure. More particularly, it should be appreciated that software, firmware, or hardware components depicted as forming part of the computing device 1300 are merely illustrative and that some components may not be present or additional components may be provided in various embodiments. While various illustrative program module(s) have been depicted and described as software module(s) stored in data storage 1320, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments; while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together, such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium, which can be used to store the information and can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   receiving, by a backend system, an indication that primary content is being presented via a second device;
   determining, by the backend system, that a first type of application is opened on a first device associated with a user that is viewing the primary content via the second device;
   receiving, by the first device, an input indicative of a desire to view secondary content associated with the primary content;
   receiving a first timestamp associated with the primary content;
   determining, based on the first timestamp, first secondary content and second secondary content associated with the primary content;
   presenting, via the first device, the first secondary content instead of the second secondary content while the primary content is presented on the second device and based on the determination that the first type of application is opened on the first device instead of a second type of application;
   continuing to receive updated timestamps from the second device;

determining, by the backend system, that a third type of application is opened on a third device, wherein the third type of application is different than the first type of application; and
presenting, via the third device and based on the determination that the third type of application is opened, fourth secondary content, wherein the fourth secondary content is different than the first secondary content, and wherein the first secondary content is presented on the first device simultaneously with the fourth secondary content being presented on the third device.

2. A method comprising:
   receiving, by a backend system an indication that primary content is being presented via a second device;
   determining, by the backend system, that a first type of application is opened on a first device;
   receiving, from the second device, a first timestamp associated with the primary content;
   determining, based on the first timestamp, first secondary content and second secondary content associated with the primary content;
   presenting, via the first device, the first secondary content instead of the second secondary content based on the determination that the first type of application is opened on the first device instead of a second type of application;
   continuing to receive updated timestamps from the second device;
   receiving a second timestamp associated with the primary content;
   determining, based on the second timestamp, a second portion of the primary content;
   determining, based on the second timestamp, third secondary content associated with the primary content; and
   presenting, via the first device, the third secondary content, wherein the first secondary content is different than the third secondary content.

3. The method of claim 2, further comprising:
   receiving an audio signal associated with the primary content; and
   encoding a first identifier within the audio signal using a frequency shift key, wherein determining the first identifier further comprises decoding a first tone.

4. The method of claim 3, further comprising:
   determining, prior to receiving the audio signal, a mapping between the first secondary content and the first timestamp.

5. The method of claim 3, further comprising:
   receiving, by the first device, a user input, wherein receiving the audio signal associated with the primary content is based on the user input.

6. The method of claim 2, wherein the primary content and first secondary content are presented simultaneously.

7. The method of claim 3, wherein a frequency of the first tone is between 18.5 and 19.5 kHz.

8. A system comprising:
   a first device configured to present primary content; and
   a second device;
   memory that stores computer-executable instructions; and
   one or more processors configured to access the memory and execute the computer-executable instructions to:
   receive, by a backend system, an indication that primary content is being presented via the second device;
   determine, by the backend system, that a first type of application is opened on the first device;

receive, from the second device, a first timestamp associated with the primary content;

determine, based on the first timestamp, first secondary content and second secondary content associated with the primary content;

continue to receive updated timestamps from the second device;

receive a second timestamp associated with the primary content;

determine, based on the second timestamp, a second portion of the primary content;

determine, based on the second timestamp, third secondary content associated with the primary content; and present, via the first device, the third secondary content, wherein the first secondary content is different than the third secondary content.

9. The system of claim 8, wherein the one or more processors are further configured to execute the computer-executable instructions to:

receive an audio signal associated with the primary content; and encode a first identifier within the audio signal using a frequency shift key, wherein determining the first identifier further comprises decoding a first tone.

10. The system of claim 9, wherein the one or more processors are further configured to execute the computer-executable instructions to:

determine, prior to receiving the audio signal, a mapping between the first secondary content and the first timestamp.

11. The system of claim 9, wherein the one or more processors are further configured to execute the computer-executable instructions to:

receive, by the second device, a user input, wherein receiving the audio signal associated with the primary content is based on the user input.

12. The system of claim 8, wherein the primary content and first secondary content are presented simultaneously.

13. The system of claim 9, wherein a frequency of the first tone is between 18.5 and 19.5 kHz.

* * * * *